(12) United States Patent
Davis

(10) Patent No.: US 7,896,178 B2
(45) Date of Patent: Mar. 1, 2011

(54) INDUSTRIAL VEHICLE COUNTERWEIGHT SYSTEM

(75) Inventor: Daniel E. Davis, San Benito, TX (US)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 12/683,789

(22) Filed: Jan. 7, 2010

(65) Prior Publication Data

US 2010/0102016 A1 Apr. 29, 2010

Related U.S. Application Data

(63) Continuation of application No. 11/746,464, filed on May 9, 2007, now abandoned, which is a continuation-in-part of application No. 11/125,691, filed on May 10, 2005, now abandoned, which is a continuation-in-part of application No. PCT/US03/07613, filed on Mar. 11, 2003.

(51) Int. Cl.
*B66C 23/74* (2006.01)
(52) U.S. Cl. .......................... 212/178; 212/196; 212/258
(58) Field of Classification Search .................. 212/178, 212/196, 258
See application file for complete search history.

(56) References Cited

U.S. PATENT DOCUMENTS

| 2,759,563 | A | * | 8/1956 | Marnon et al. | 280/755 |
| 3,278,045 | A | * | 10/1966 | Potter et al. | 212/178 |
| 3,851,776 | A | * | 12/1974 | Leyrat | 414/719 |
| 3,945,518 | A | * | 3/1976 | Inoue | 414/719 |
| 7,669,898 | B2 | * | 3/2010 | Hamaguchi et al. | 280/759 |

* cited by examiner

*Primary Examiner* — Thomas J Brahan
(74) *Attorney, Agent, or Firm* — Hunton & Williams

(57) ABSTRACT

Embodiments of the present invention generally relate to a pipelayer and a method for of loading a pipelayer or excavator for transportation. One embodiment includes a method for transporting a pipelayer or excavator from a first work site to a second worksite via a public road. The method includes acts of: raising the pipelayer or excavator off of track shoes of the pipelayer or excavator; removing a first track assembly from the pipelayer or excavator using a boom of the pipelayer or a boom assembly of the excavator; loading the first track assembly onto a first trailer of a first tractor-trailer using the boom of the remaining pipelayer or the boom assembly of the remaining excavator; removing the second track assembly from the pipelayer using the boom of the remaining pipelayer or the boom assembly of the remaining excavator; and loading the second track assembly onto the first trailer using the boom of the remaining pipelayer or the boom assembly of the remaining excavator.

16 Claims, 25 Drawing Sheets

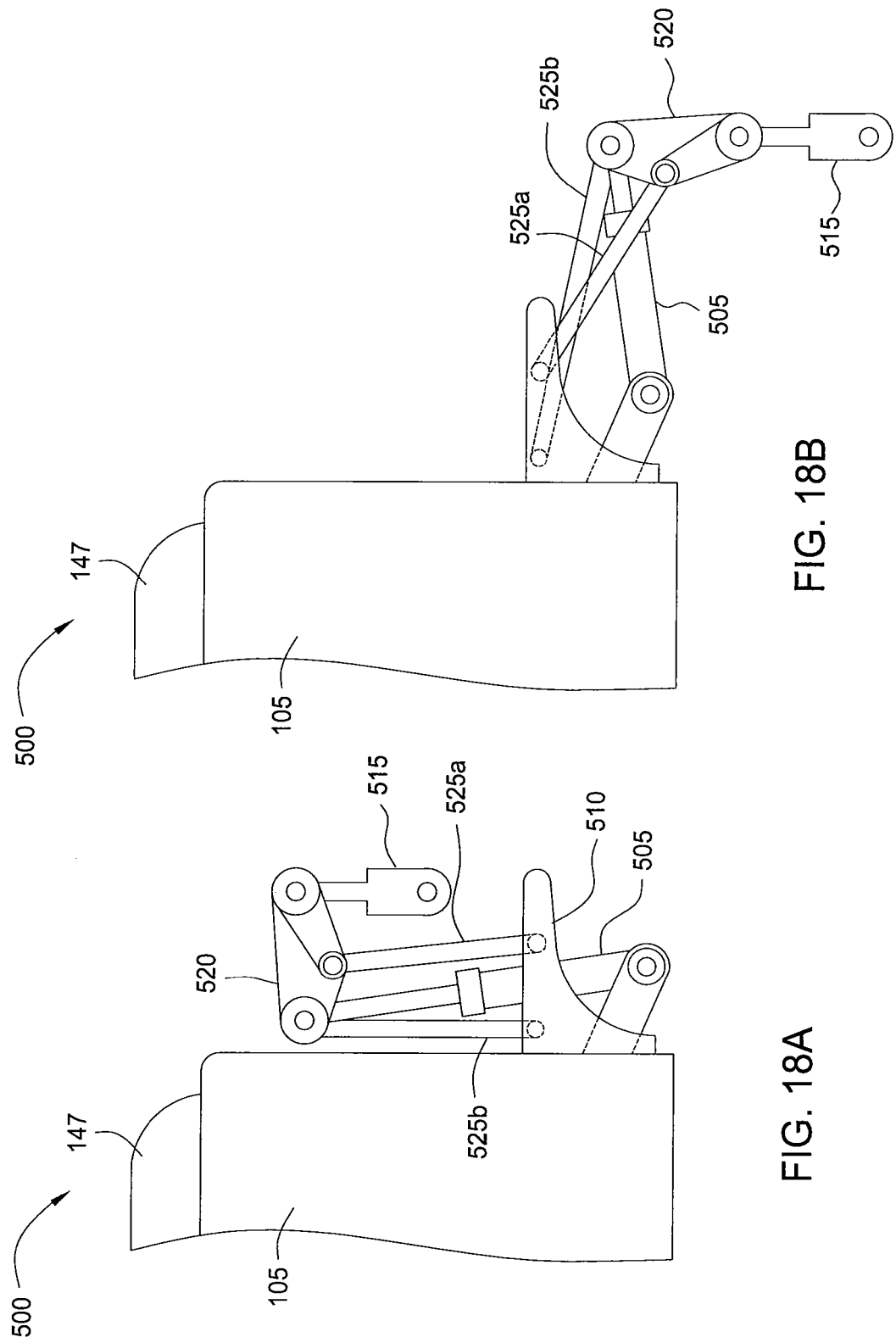

INDUSTRIAL VEHICLE COUNTERWEIGHT SYSTEM

CROSS-REFERENCE TO RELATED APPLICATIONS

This application is a continuation of U.S. patent application Ser. No. 11/746,464, filed May 9, 2007, now abandoned which is a continuation-in-part of U.S. patent application Ser. No. 11/125,691, filed May 10, 2005, now abandoned which is a continuation-in-part (petition pending) of International Application No. PCT/US2003/007613, filed Mar. 11, 2003.

BACKGROUND OF THE INVENTION

1. Field of the Invention

Embodiments of the present invention generally relate to a pipelayer and a method for of loading a pipelayer or excavator for transportation.

2. Description of the Related Art

FIG. 1 is a front view of a prior art pipelayer 10. The pipelayer 10 is typically used for the construction of underground pipelines which transport hydrocarbons, such as natural gas or gasoline. Typical operation of the pipe layer includes raising, carrying, and lowering heavy pipe 12. The pipelayer 10 is a crawler or tractor-type vehicle having a maneuverable boom 42 disposed on a side thereof. For this reason, the pipelayer 10 is referred to as a sideboom.

The pipelayer 10 further includes a main frame assembly 14 having first and second opposed sides 16 and 18 and a radiator guard 20. The pipelayer 10 includes first and second endless self-laying track assemblies 22, 24, with each of the track assemblies 22, 24 having a roller frame. A rigid cross bar 28 and a pivot shaft connect each track assembly 22, 24 to a respective side 16, 18 of the main frame assembly 14. A pipelayer frame 32 has a first portion 34 secured to the main frame assembly 14 and a second portion 36 secured to one of the roller frames by a plurality of fasteners. The first portion 34 is joined to the second portion 36 by a pin arrangement 40. The boom arm 42 has a first end portion 44, pivotally connected to the pipelayer frame second portion 36, and a second end portion 46 supporting a cable operated load block assembly 48. A drawworks 50 runs a cable 52 in and out to raise and lower the block assembly 48 and the pipe 12. A fluid operated cylinder 54 has a first end portion 56 connected to the pipelayer frame 32 and a second end portion 58 releasably connected to the boom arm second end portion 46. A counterweight 55 is attached to the main frame 14. The counterweight 55 may also be secured to one of the roller frames by a counterweight frame (not shown) similar to the pipelayer frame 32.

The boom arm 42 of the pipelayer 10 cannot rotate without driving the track assemblies 22, 24. To deliver a piece of pipe from the pipe delivery vehicle located on an opposite side of the pipelayer relative to the pipeline trench, the pipelayer would have to drive the track assemblies 22, 24 in order to turn 180 degrees so that the boom would face the pipe delivery vehicle, pick up the pipe, and drive the track assemblies 22,24 in order to turn 180 degrees so that the boom arm 42 would face the trench in order to deliver the piece of pipe.

Further, the pipelayer 10 is a specialized vehicle. It is not configured to perform other jobs at a pipeline work site, such as excavation, When pipelaying duties are complete, the pipelayer may idle in a yard until required again, which may be a substantial period of time.

The boom arm 42, the pipelayer frame 32, and the counterweight frame increase the width of the pipelayer 10 versus traditional crawlers. This increased width causes difficulty in transporting the pipelayer from one work site to another over public roads as the increased width means that the pipelayer will not fit on a standard trailer without requiring permits and/or pilot vehicles which increase the expense associated with transportation. Alternatively, the boom arm 42, the pipelayer frame 32, the counterweight 55, and the counterweight frame of the pipelayer 10 may be removed for transportation. However, this substantial disassembly of the pipelayer 10 increases the labor and thus also increases transportation costs.

Therefore, there exists a need in the art for a pipelayer that facilitates the pipelaying operation, may be used for other purposes, and/or possesses the ability to be transported via public roads with minimal disassembly.

SUMMARY OF THE INVENTION

Embodiments of the present invention generally relate to a pipelayer and a method for of loading a pipelayer or excavator for transportation. One embodiment includes a method for transporting a pipelayer or excavator from a first work site to a second worksite via a public road. The method includes acts of: raising the pipelayer or excavator off of track shoes of the pipelayer or excavator; removing a first track assembly from the pipelayer or excavator using a boom of the pipelayer or a boom assembly of the excavator; loading the first track assembly onto a first trailer of a first tractor-trailer using the boom of the remaining pipelayer or the boom assembly of the remaining excavator; removing the second track assembly from the pipelayer using the boom of the remaining pipelayer or the boom assembly of the remaining excavator; and loading the second track assembly onto the first trailer using the boom of the remaining pipelayer or the boom assembly of the remaining excavator.

Another embodiment includes a pipelayer. The pipelayer includes an undercarriage and a main assembly supported by the undercarriage so that the main assembly may rotate relative to the undercarriage. The undercarriage includes a lower frame and two track assemblies. Each track assembly includes a track frame removably attached to the lower frame and a track shoe supported by the track frame so that the track shoe may move around the track frame. The main assembly includes a main frame and a boom pivoted to the main frame.

Another embodiment includes a method of using a pipelayer. The method includes acts of: providing a pipelayer; removing a counterweight of the pipelayer; and operating the pipelayer on a steep grade without the counterweight.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates a perspective view of the pipelayer, wherein a longitudinal axis $L_{mf}$ of the main assembly is perpendicular to a longitudinal axis Luc of the undercarriage.

FIG. 3 illustrates another perspective view of the pipelayer, wherein the longitudinal axis $L_{mf}$ of the main assembly is parallel to a longitudinal axis $L_{uc}$ of the undercarriage.

FIG. 4 illustrates another perspective view of the pipelayer, wherein the longitudinal axis $L_{mf}$ of the main assembly is parallel to a longitudinal axis $L_{uc}$ of the undercarriage.

FIG. 5 illustrates an orthogonal view of the pipelayer, wherein the longitudinal axis $L_{mf}$ of the main assembly is perpendicular to a longitudinal axis $L_{uc}$ of the undercarriage.

FIG. 6 illustrates another orthogonal view of the pipelayer, wherein the longitudinal axis $L_{mf}$ of the main assembly is parallel to a longitudinal axis $L_{uc}$ of the undercarriage.

FIG. 7 illustrates the outriggers in the extended position and one of the track assemblies loaded on a first trailer.

FIG. 8 illustrates the other one of the track assemblies loaded on the first trailer.

FIG. 9 illustrates an act of backing the second trailer underneath the remaining pipelayer.

FIG. 10 illustrates axles of the second trailer passing underneath the remaining pipelayer.

FIG. 11 illustrates the remaining pipelayer loaded on the second trailer.

FIG. 12 illustrates the boom and counterweight loaded on a third trailer.

FIGS. 18A-D illustrate a removable counterweight system (RCW), according to another embodiment of the present invention. FIG. 18A is a side view of the RCW in a first position where a counterweight is engaged with the main frame. FIG. 188 is a side view of the RCW in a second position where the counterweight is dis-engaged with the main frame and set on the ground. FIG. 18C is a front view of the counterweight. FIG. 18D is a section view of FIG. 18C taken along line 18D-180.

FIG. 19 illustrates the outriggers in the extended position and a first act of loading one of the track assemblies on the first trailer.

FIG. 20 illustrates a second act of loading one of the track assemblies on the first trailer.

FIG. 21 illustrates the remaining excavator loaded on the second trailer.

FIG. 22 illustrates the excavator driven over the trailer after a gooseneck of the trailer has been removed.

FIG. 23 illustrates the excavator lifted off the track shoes by the gooseneck jack.

DETAILED DESCRIPTION

Figure 1:
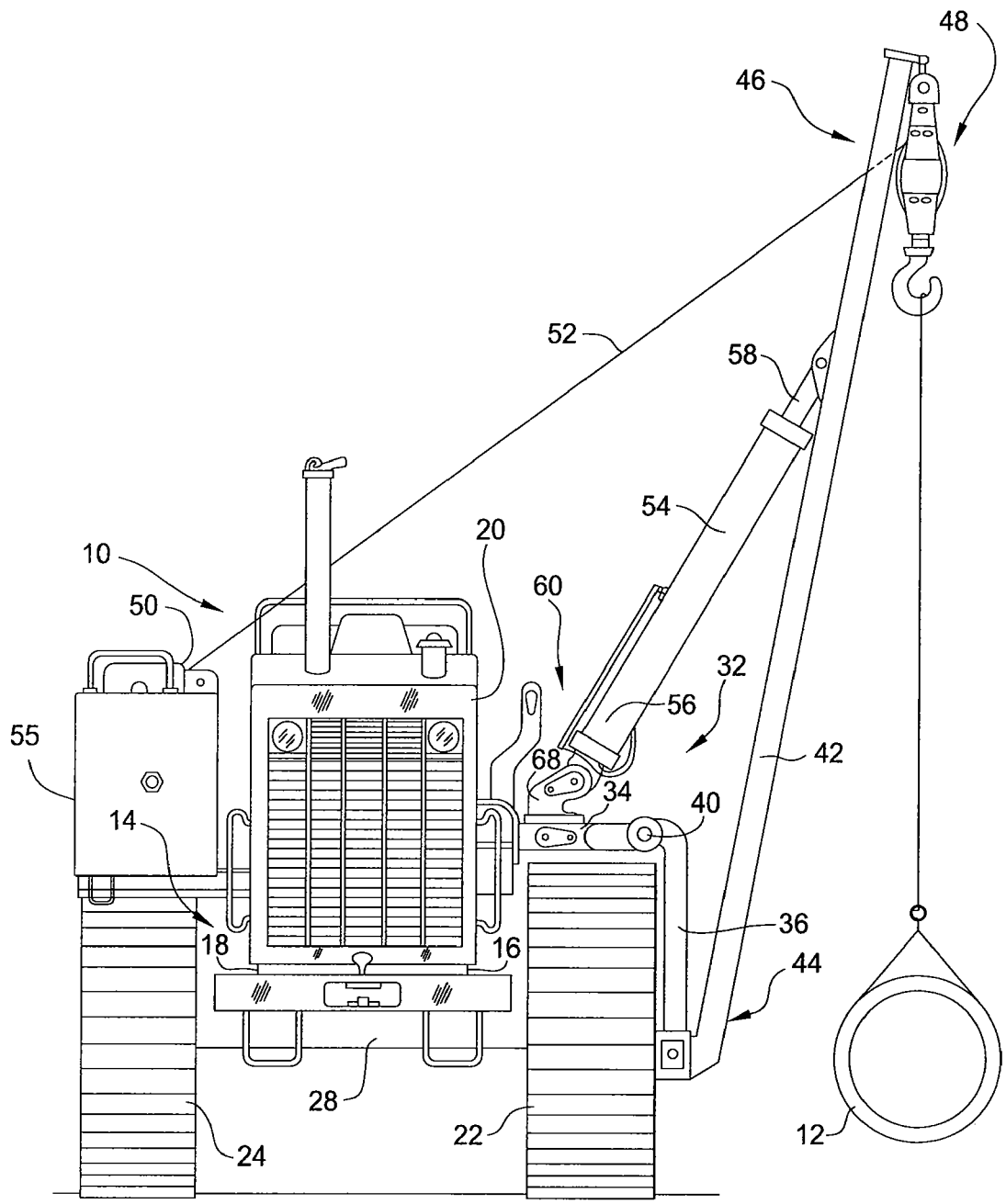
FIG. 1 is a front view of a prior art pipelayer.
Figure 2:
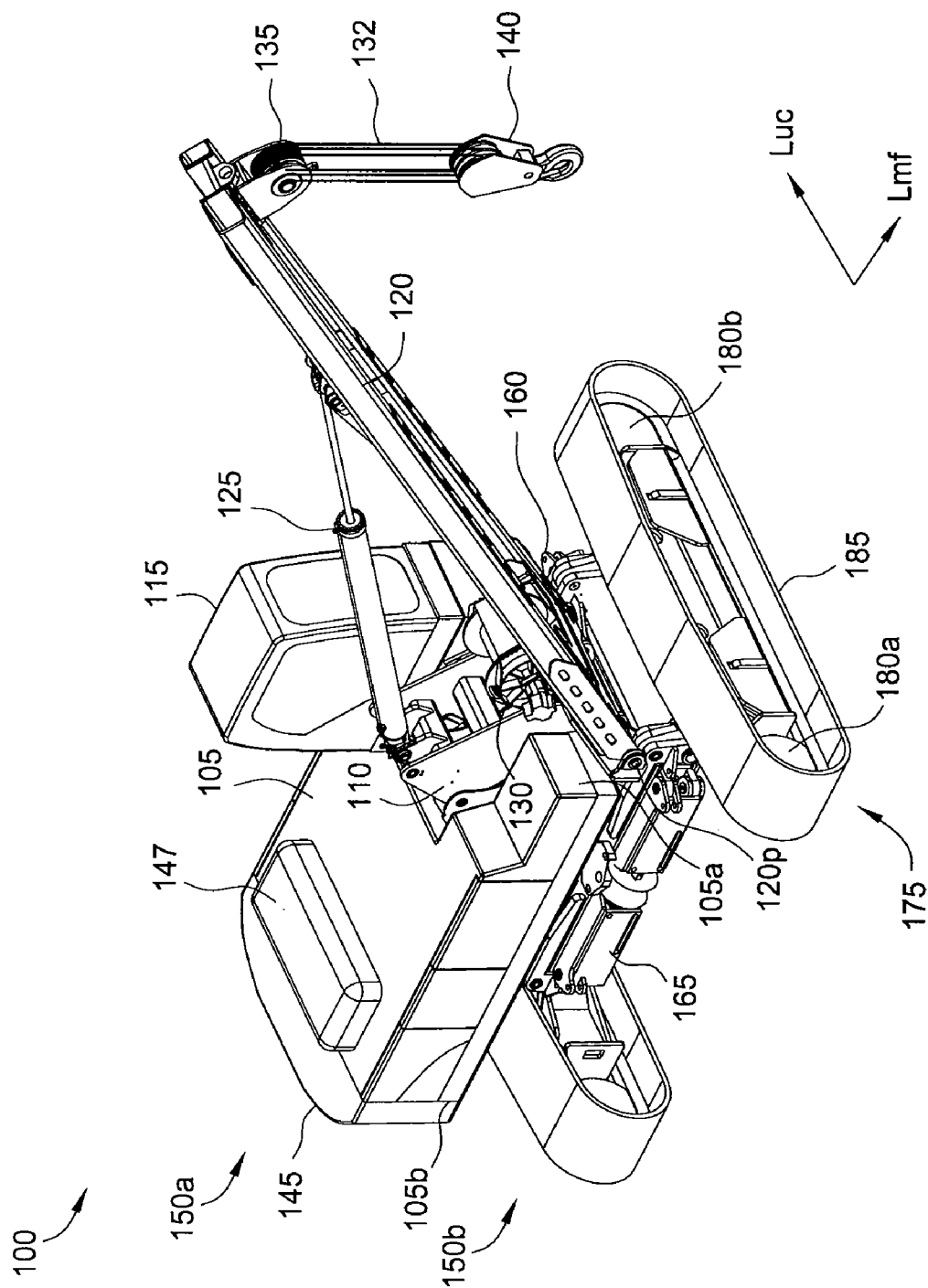
FIGS. 2-6 are various views of a pipelayer, according to one embodiment of the present invention.
Figure 3:
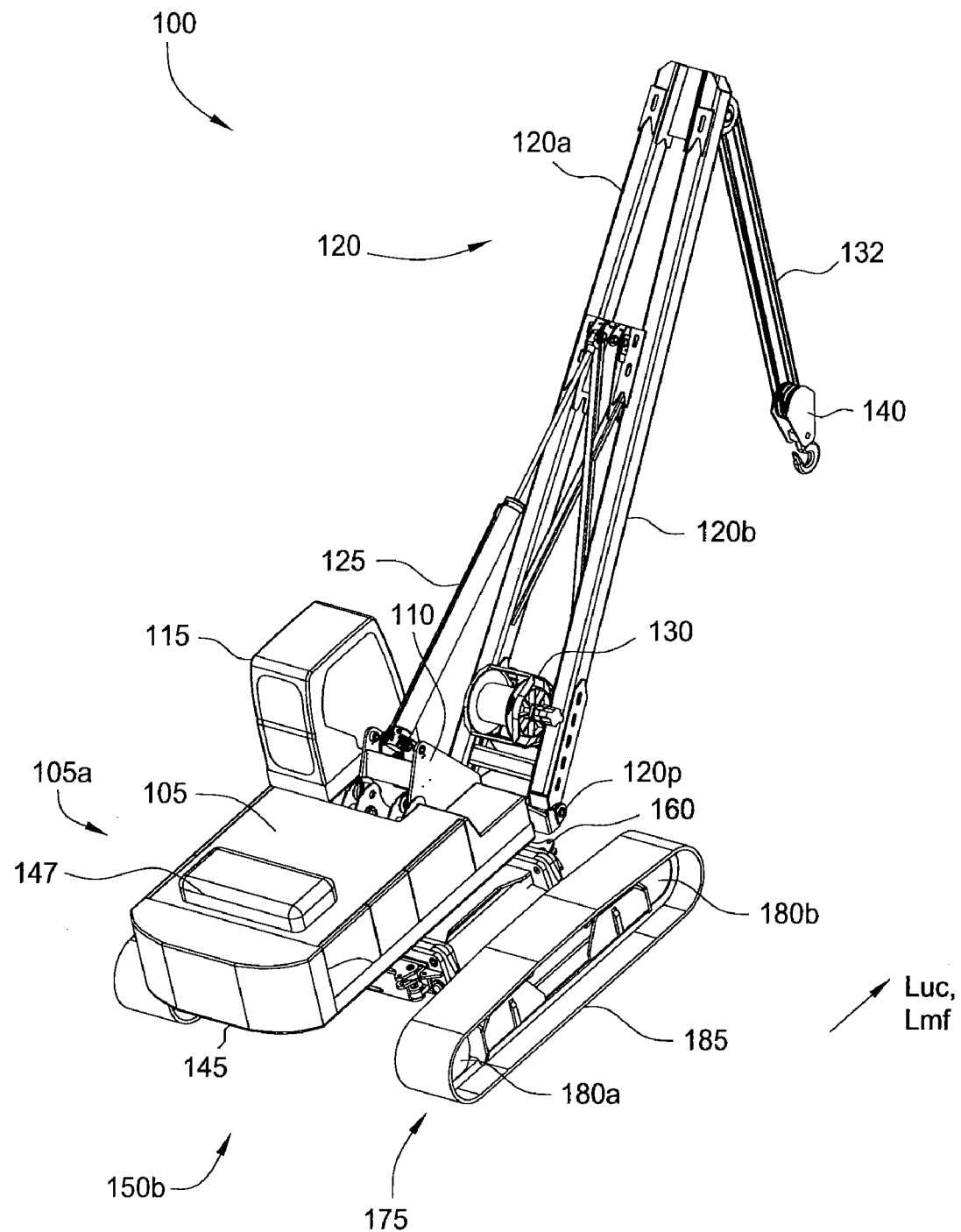
Figure 4:
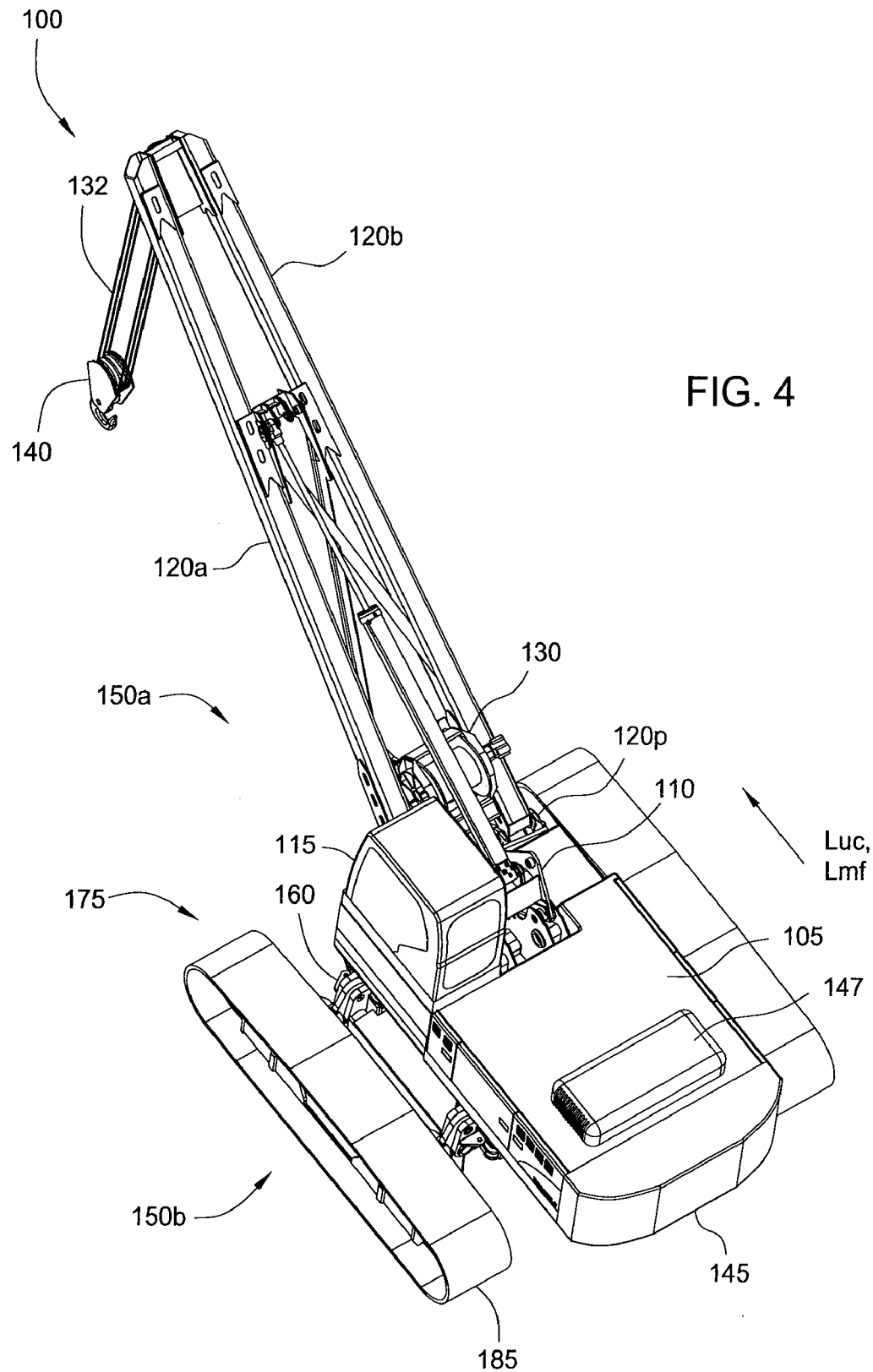
Figure 5:
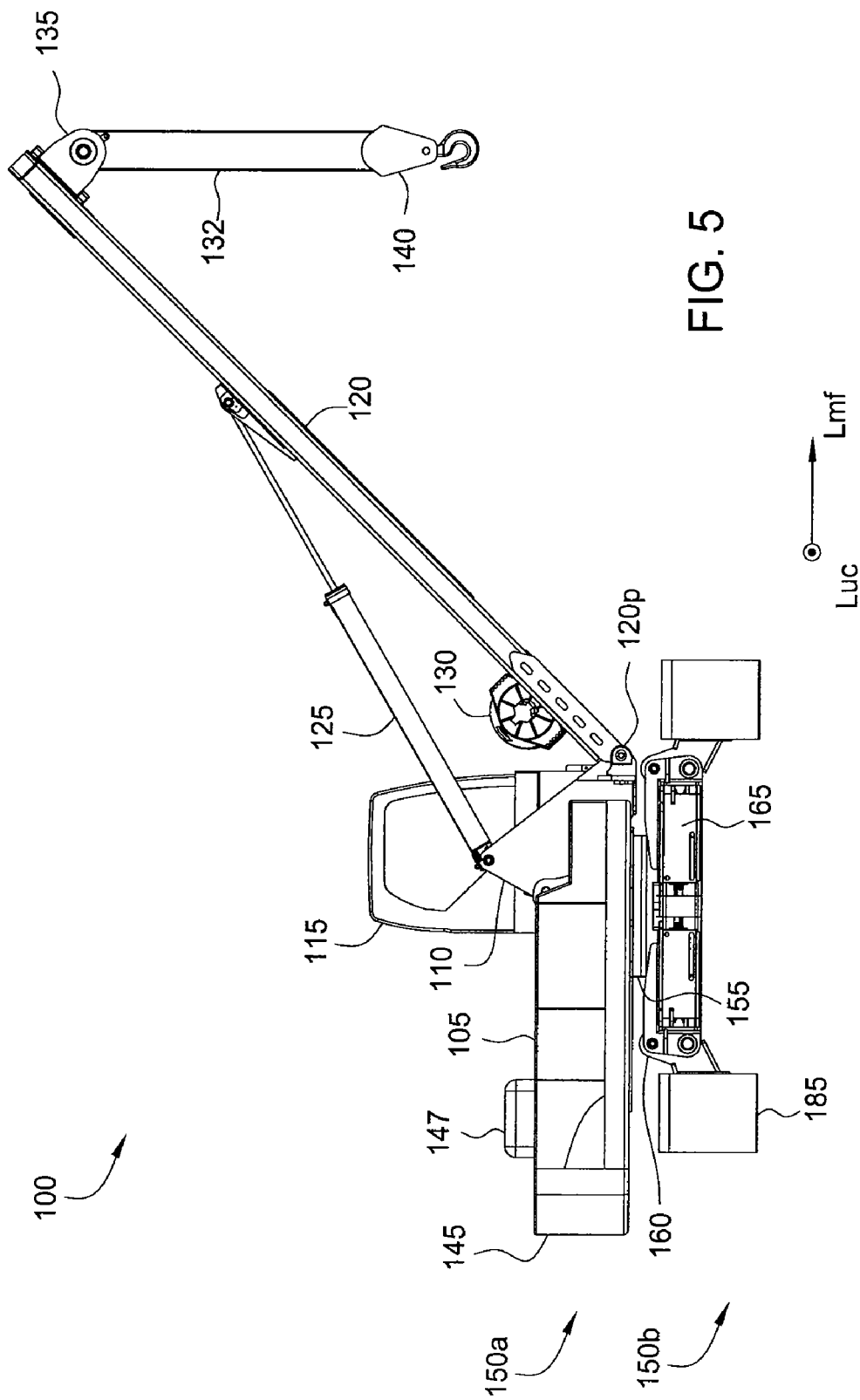
Figure 6:
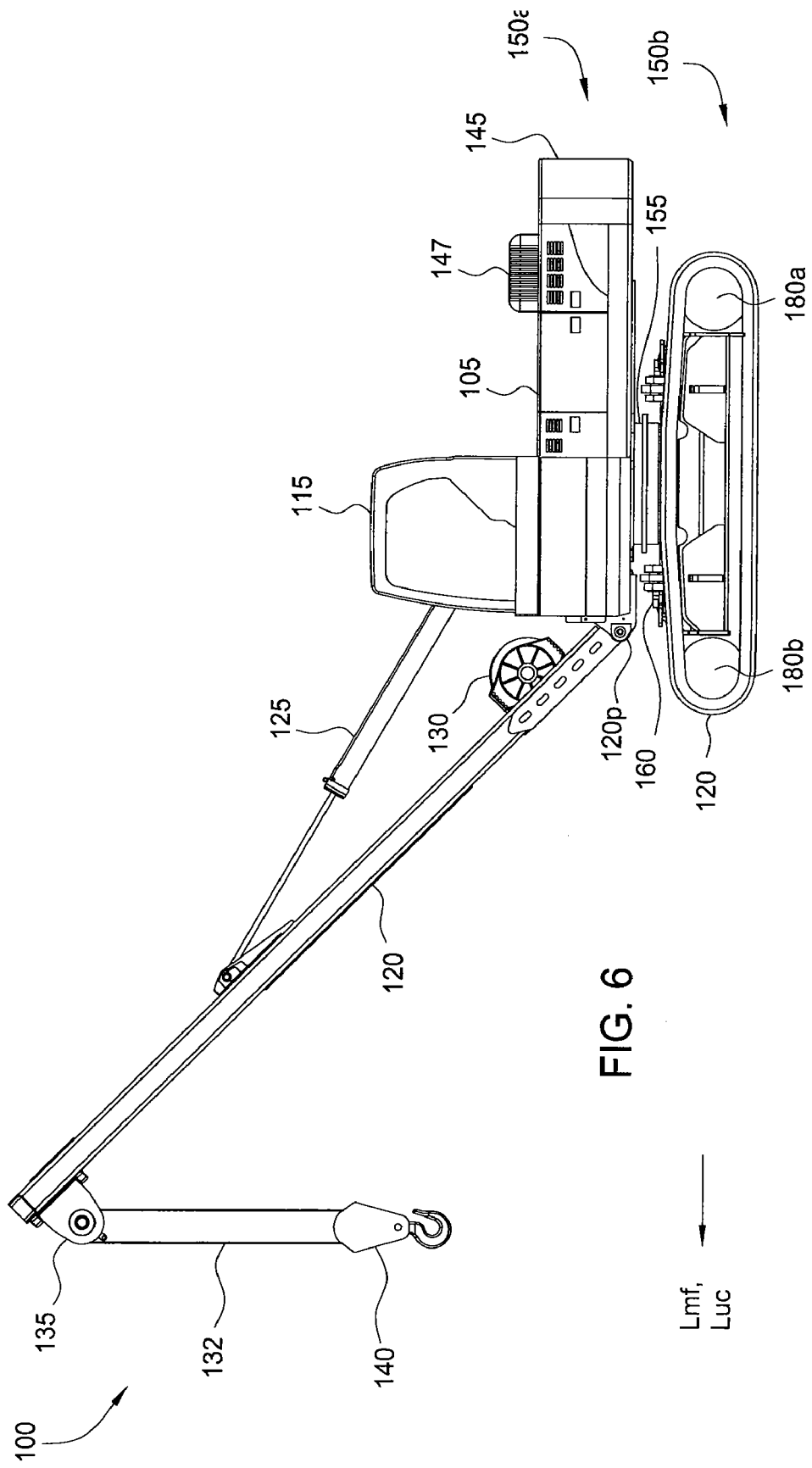

FIGS. 2-6 are various views of a pipelayer 100, according to one embodiment of the present invention. The pipelayer 100 includes a main assembly 150a mounted on an undercarriage 150b so that the main assembly 150a may rotate relative to the undercarriage 150b. FIG. 2 illustrates a perspective view of the pipelayer 100, wherein a longitudinal axis $L_{mf}$ of the main assembly 150a is perpendicular to a longitudinal axis $L_{uc}$ of the undercarriage 150b. FIG. 3 illustrates another perspective view of the pipelayer 100, wherein the longitudinal axis $L_{mf}$ of the main assembly 150a is parallel to a longitudinal axis Luc of the undercarriage 150b. FIG. 4 illustrates another perspective view of the pipelayer 100, wherein the longitudinal axis $L_{mf}$ of the main assembly 150a is parallel to a longitudinal axis $L_{uc}$ of the undercarriage 150b. FIG. 5 illustrates an orthogonal view of the pipelayer 100, wherein the longitudinal axis $L_{mf}$ of the main assembly 150a is perpendicular to a longitudinal axis $L_{uc}$ of the undercarriage 150b. FIG. 6 illustrates another orthogonal view of the pipelayer 100, wherein the longitudinal axis $L_{mf}$ of the main assembly 150a is parallel to a longitudinal axis Luc of the undercarriage 150b.

The main assembly 150a includes a main frame 105, an optional adaptor 110, a cab 115, a boom 120, a piston and cylinder assembly 125, a winch 130, a pulley block 135, a load block 140, a counterweight 145, and an engine 147. The main frame 105 has a first side 105a and a second side 105b distal from the first side 105a. Attached to the first side 105a are the optional adaptor 110 and the operator's cab 115. Pivoted to the adaptor 110 at 120p is a first longitudinal end of the boom 120. As used herein, the term pivoted or pivot includes a single axis pivot, such as a hinge, and a double axis pivot, such as a universal joint. The piston and cylinder assembly (PCA) 125 is also pivoted to the adaptor 110 and to the boom 120 so that extension of the PCA 125 will lower the boom and retraction of the PCA will raise the boom 120. The adaptor 110 may be removably attached to the frame 110 to allow the boom 120 to be replaced with an excavator boom (not shown) or a crane boom (not shown). Alternatively, the boom 120 may be directly pivoted to the main frame 105.

Attached near the first longitudinal end of the boom 120 is a winch 130. The winch 130 includes a drum having a cable 132 (only partially shown) wrapped therearound. The drum is rotatable relative to a housing of the winch. The drum may be driven by a hydraulic motor (not shown). Pivoted to a second longitudinal end of the boom 120 is a pulley block 135. Hung from the pulley block 135 by the cable 132 is a load block 140. Each of the blocks 135, 140 include a plurality of pulleys or sheaves. The cable 132 extends from the winch drum along the boom 120 and around the sheaves of the pulley block 135 and load block 140 in order to achieve a mechanical advantage. Unwinding of the cable 132 from the drum lowers the load block 140 and winding of the cable 132 around the drum raises the load block 140.

The boom 120 may be an A-frame and may include two primary structural members 120a, b and two cross bars. The boom 120 may also be asymmetric in that one of the primary structural members 120a may extend from the main frame 105 at a first angle relative to a vertical axis that is less than a second angle relative to the vertical axis at which the other one 120b of the primary structural members extends from the main frame. The asymmetric design allows better visibility for the operator and improves loading characteristics of the boom as compared to a symmetric design. The structural members 120a, b may be made from high strength steel square tubing. Alternatively, the boom may be a symmetric A-frame or include only a single structural member.

Attached to the second side 105b is a counterweight 145. Housed in the second side 105b of the main frame is an engine 147. The engine 147 may drive a hydraulic pump (not shown) and a generator or alternator (not shown) for providing hydraulic or electrical energy to components, such as the cab sensors, the PCA 125, and the winch 130. Associated hydraulic and electrical circuitry (not shown) interconnecting these components may also be provided. The engine may be a diesel engine or an alternative fuel engine. Examples of alternative fuel engines include diesel-electric hybrid and hydrogen fuel-cells. The diesel-electric hybrid may use a smaller diesel engine and a bank of batteries (not shown) which would allow operation of the pipelayer 100 without operation of the diesel engine.

Rotation of the main assembly 150a relative to the undercarriage 150b and support for the main assembly 150a by the undercarriage 150b are provided by a rotary drive mechanism (not shown) and a bearing 155. The rotary drive mechanism may include a hydraulic or electric motor (not shown) attached to the main frame and rotationally coupled to a pinion (not shown) which meshes with a gear (not shown) rotationally coupled to the undercarriage 150. Operation of the motor will cause the main assembly 150a to rotate relative to the undercarriage 150b. The rotary drive mechanism may further include a turn lock mechanism (not shown) for selectively rotationally coupling the main assembly 150a relative to the undercarriage 150b. The turn lock mechanism may include a gear tooth (not shown) selectively engageable with the gear via operation of a hydraulic cylinder or electric motor (not shown) and a proximity switch to verify engagement of the tooth with the gear. Engagement of the gear with the tooth rotationally couples the main assembly 150a to the undercarriage 150b. Verification of engagement by the proximity switch also prevents operation of the motor.

Alternatively, the turn lock mechanism may include a disk (not shown) incorporated in the motor and a retaining mechanism for retaining the disk. The turn lock mechanism is such that when the rotary motor is stopped, the disk is retained by the retaining mechanism to fix a rotor of the motor so as not to rotate, and when the motor is started, the disk is hydraulically or electrically disengaged from the motor, thereby freeing the rotor.

The cab 115 is includes walls, a ceiling, and windows to protect the operator from weather conditions and allow visibility for the operator. Placement of the cab 115 on the main frame 105a may allow the operator unobstructed view to the front, left, and/or right. The cab 115 further includes a seat (not shown), operating instruments (not shown), and operating controls (not shown). The cab may further include a load management system (LMS). The LMS is a microprocessor based system and includes a variety of sensors in communication with the microprocessor to calculate and display boom angle, boom capacity, and/or the load on load block. The LMS may include a database of boom capacities for various operating positions and surface grades. The LMS may alert the operator, with audio and/or visual warnings, when rated capacity is imminent, reached, and/or exceeded.

The LMS may allow an operator to simulate a multi-position pipelaying operation before performing the operation. The operator may move the pipelayer through various expected positions of the operation and note the load capacity at each position. Alternatively, the LMS may be programmed to record the capacity at each position and simulate the operation once the actual load is known. The operator then may pick up the load and estimate whether the load will exceed the load capacity at any of the expected positions. If so, he may then re-configure the expected positions until the load may be safely handled. The LMS may also warn the operator of an impending two-block event (when the load block contacts the pulley block).

The LMS system may also log a history of the lifts performed by the pipelayer 100, and this data can be downloaded to a computer for later analysis. The LMS may include an external, boom-mounted light bar to provide a simple visual indicator of approximate load on hook. The light bar may include a color scheme of lights. For example, green lights mean the crane is under a light load, yellow indicates a heavier load, and a red signals a high load condition. The LMS may also monitor grade of the surface that the pipelayer is operating on and calculate and display the proper load value that corresponds to the grade. The LMS may communicate with an LMS of a second pipe layer 100 and indicate the load distribution between the two pipelayers for pipe laying operations performed in tandem. With this information, the operators may coordinate activities to ensure that an optimal load distribution is maintained.

The undercarriage 150b includes a lower frame 160 attached to the bearing 155 and two track assemblies 175, each removably attached to the lower frame 160. Each of the track assemblies 175 includes a track frame and one or more rollers 180a,b, such as sprockets, operatively coupled to a track shoe or belt 185. The track shoe 185 extends around the track frame and is movable relative to the track frame. The rollers 180a, b are supported by the track frame so that the rollers may rotate relative to the track frame. One of the rollers 180a, b may be a drive sprocket and the other an idler roller. A rotor of an electric or hydraulic track motor (not shown) may be rotationally coupled to the drive sprocket and a housing of the track motor may be attached to the track frame. A conduit, such as an electrical cable or hydraulic hose, may extend from the main frame 105 to the track motor. The conduit may be connected to the track motor by a quick-connect fitting. Operation of the track motor will cause movement of the track shoe 185 relative to the track frame.

Figure 2A:
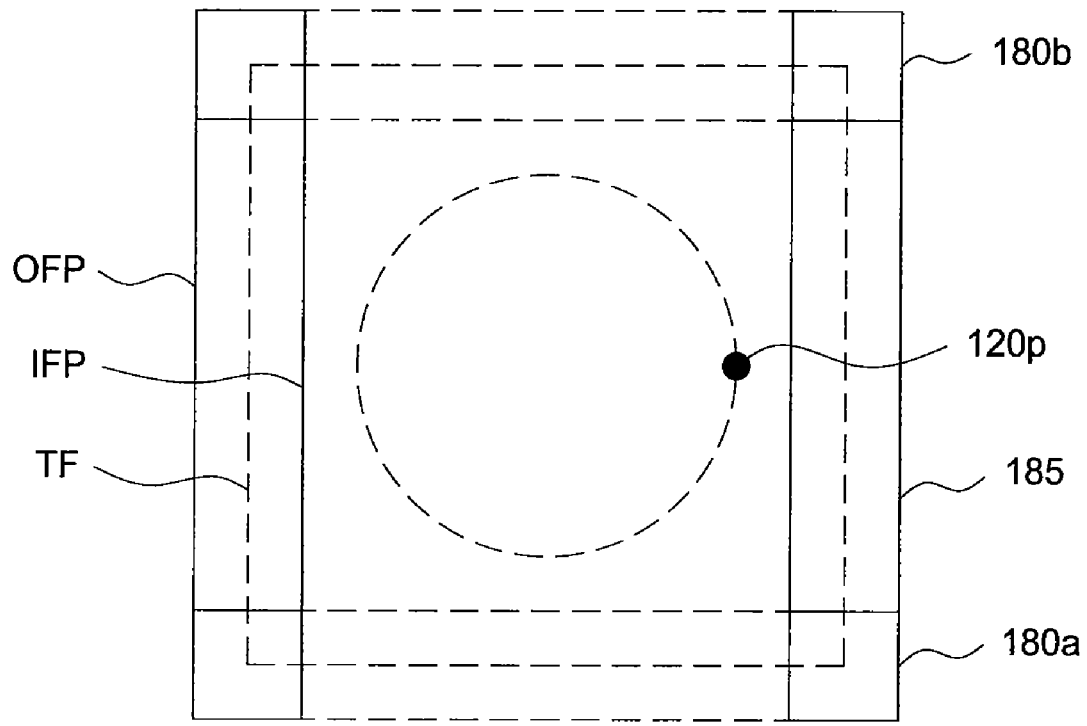
FIG. 2A is a schematic illustrating a configuration of the pipelayer so that the boom pivot is within both a rectangular footprint and a rectangular tipping fulcrum of the pipelayer.

FIG. 2A is a schematic illustrating configuration of the pipelayer 100 so that the boom pivot 120p is within a rectangular outer footprint OFP, a rectangular tipping fulcrum TF, and a rectangular inner footprint IFP of the pipelayer 100. The outer footprint OFP is defined by outer sides of the track shoes 185. The tipping fulcrum TF is defined by longitudinal centerlines of each of the track shoes 185 and by longitudinal centerlines of the rollers 180a, b. The inner footprint IFP is defined by inner sides of the track shoes 185. Since the boom pivot 120p is within the footprints OFP, IFP and the tipping fulcrum TF in the perpendicular and parallel positions of FIGS. 5 and 6, then it is also within the footprints and tipping fulcrum for any rotational position of the main frame relative to the undercarriage (represented by the dashed circle). Alternatively, the boom pivot 120p may be disposed between the outer footprint OFP and the tipping fulcrum TF or the inner footprint IFP and the tipping fulcrum TF.

Figure 7:
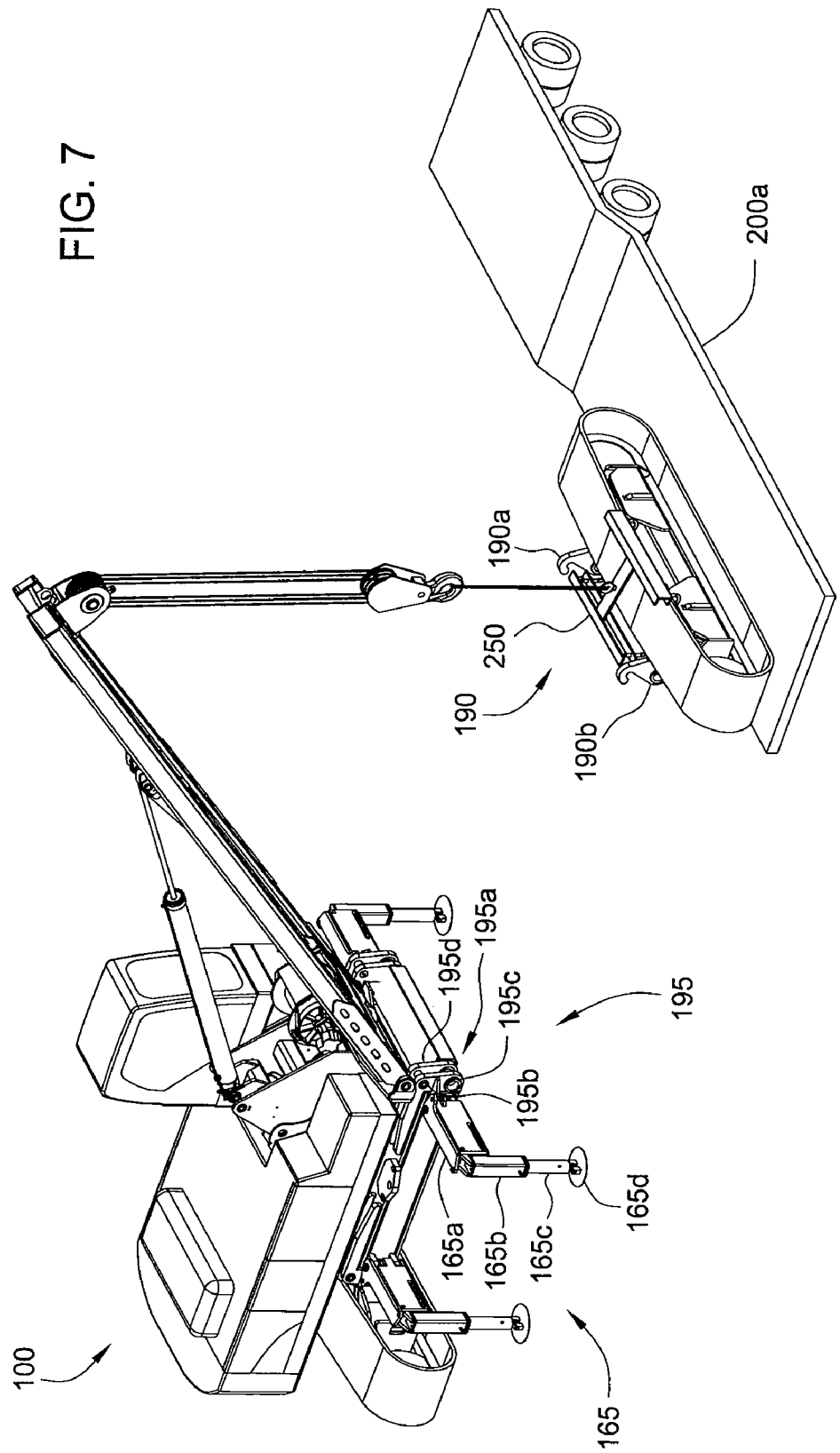
FIGS. 7-12 illustrate acts of a method for partially disassembling the pipelayer and loading the pipelayer on two tractor-trailers (only trailer shown) for transporting the pipelayer between jobs, according to another embodiment of the present invention.
Figure 8:
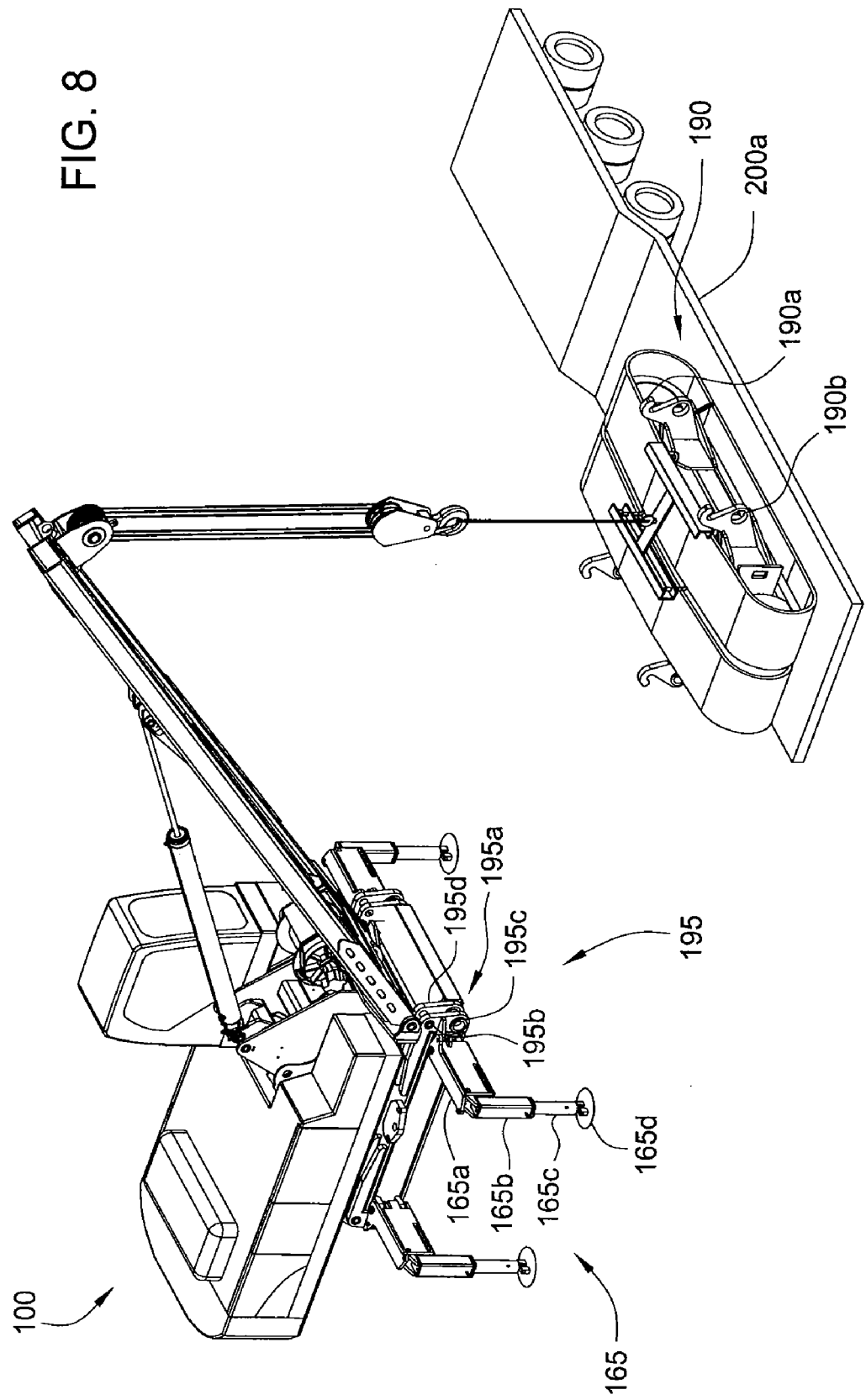

FIGS. 7-12 illustrate acts of a method for partially disassembling the pipelayer 100 and loading the pipelayer on two or more tractor-trailers 200a-c (only trailer shown and gooseneck removed for simplicity) for transporting the pipelayer 100 between work sites over public roads, according to another embodiment of the present invention. The trailers 200a-c may be standard lowboy flatbed trailers. FIG. 7 illustrates outriggers 165 in the extended position and one of the track assemblies 175 loaded on a first trailer 200a. FIG. 8 illustrates the other one of the track assemblies 175 loaded on the first trailer 200a.

To facilitate dis-assembly of the pipelayer 100 for transport and re-assembly of the pipelayer 100 for delivery to the next job site, each of the track assemblies 175 may include one or more lugs 190 attached to the track frame. Each of the lugs 190 may include a hook 190a and a hole 190b. Each of the lugs 190 is received in an opening 195a of a bracket assembly 195 of the lower frame 160. The bracket assembly 195 may include two plates 195d spaced apart to define the opening 195a, each plate 195d attached to the lower frame 160. Fasteners 195b, c (i.e., a bolt or a pin) may each be disposed through corresponding holes in the plates 195d. To attach each track assembly 175 to the lower frame 160, the fastener 195c is removed and the hook 190a is engaged with the fastener 195b and the fastener 195c is then inserted through holes in the plates 195d and the hole 190b and then locked to the track frame (i.e. by a nut or a clip). The track conduit may then be connected to the track motor by the quick-connect fitting. Alternatively, the lug 190 may be attached to the lower frame 160 and the bracket assembly 195 may be attached to the track frame.

Alternatively, each of the track motor housings may be attached to the lower frame 160 and each rotor thereof rotationally coupled to a respective drive roller via a removable shaft. The shaft would be removably rotationally coupled at the track motor. Alternatively, each of the track assemblies 175 may be attached to the lower frame 160 by one or more telescoping axles (not shown). The telescoping axles would extend to provide a wide footprint for pipelaying operation and retract to provide a narrow footprint for transportation.

To further facilitate dis-assembly for transport and re-assembly for delivery of the pipelayer 100, one or more outriggers 165 are selectively pivotal relative to the lower frame. Each outrigger may include a first arm 165a, a second arm 165b, a third arm 165c, and a pad 165d. The first arm 165a is selectively pivotal relative to the lower frame 160. The second arm 165b is selectively pivotal relative to the first arm and is retractable within the first arm 165a. The third arm 165c is selectively longitudinally coupled to the second arm 165b and is retractable within the third arm 165c. The pad 165d is pivoted to the third arm 165c. The outriggers 165 are operable between an extended position and a retracted position.

Starting from a retracted position {FIG. 2}, the first arm 165a is pivoted from a retracted position against a side of the lower frame 160 to an extended position about perpendicular to the side of the lower frame 160. The first arm 165a may then be locked into position. The second arm 165b is then extended from within the first arm 165a. The second arm 165b may begin to pivot downward as it is being extended or may be locked Into a position parallel to the first arm. When the second arm 165b is fully extended it either pivots to a perpendicular position relative to the first arm 165a or unlocked so that it may pivot to such a position. The second arm 165b is then locked into the perpendicular position. The third arm 165c and the pad 165d may then be extended from within the second arm 165b. As the third arm 165c extends, the pad 165d will contact the ground and begin to lift the pipelayer off of the track shoes 185. The arms 165 may be coordinated so that all of the arms operate simultaneously.

Once the third arm 165c is fully extended, the third arm 165c may be locked into position. The outrigger 165 is then fully actuated.

The track assemblies 175 may then be removed. To operate the outrigger 165 to the retraced position the above recited process is reversed. Operation of the outrigger 165 may be fully automated and controlled from the cab and/or wirelessly by a remote control (not shown) so that the operator may view operation of the outrigger 165 from the ground. Automation of the outrigger 165 operation may be accomplished by the provision of a hydraulic or electric motor or piston (not shown) to pivot the first arm 165a and hydraulic or electric lines (not shown) to actuate the second 165b and third 165c arms and the locking mechanisms.

The outriggers 165 are operated to lift the pipelayer 100 off of the track shoes 185. The fasteners 195c are removed. The boom 120 and the load block 140 are used to lift the track assembly 175 from the lower frame 160. To accomplish this, the boom 120 may be raised to a substantially vertical position and the load block 140 may be lowered to the track assembly 175 that is being removed. The track assembly 175 may be prepared for loading by attaching a clamp 250 that grasps edges of the track assembly 175 and has a lifting lug for connection to the load block 140. Alternatively, chains with hooks (not shown) could be used instead of the clamp 250. The load block 140 may be raised to lift the track assembly 175 from the lower frame 160. The boom 120 may then be lowered to move the track assembly 175 over the trailer. The load block 140 may then be lowered to set the track assembly 175 onto the trailer 200a. Removal of the second track assembly 175 is similar to that of the first track assembly 175 with the addition that the main assembly 150a may be rotated so that the cab 115 faces the second track assembly 175 and then rotated back after the second track assembly 175 is secured so that the second track assembly 175 may be placed on the trailer 200a. Alternatively, the trailer 200a may instead be moved adjacent to the second track assembly 175.

Figure 9:
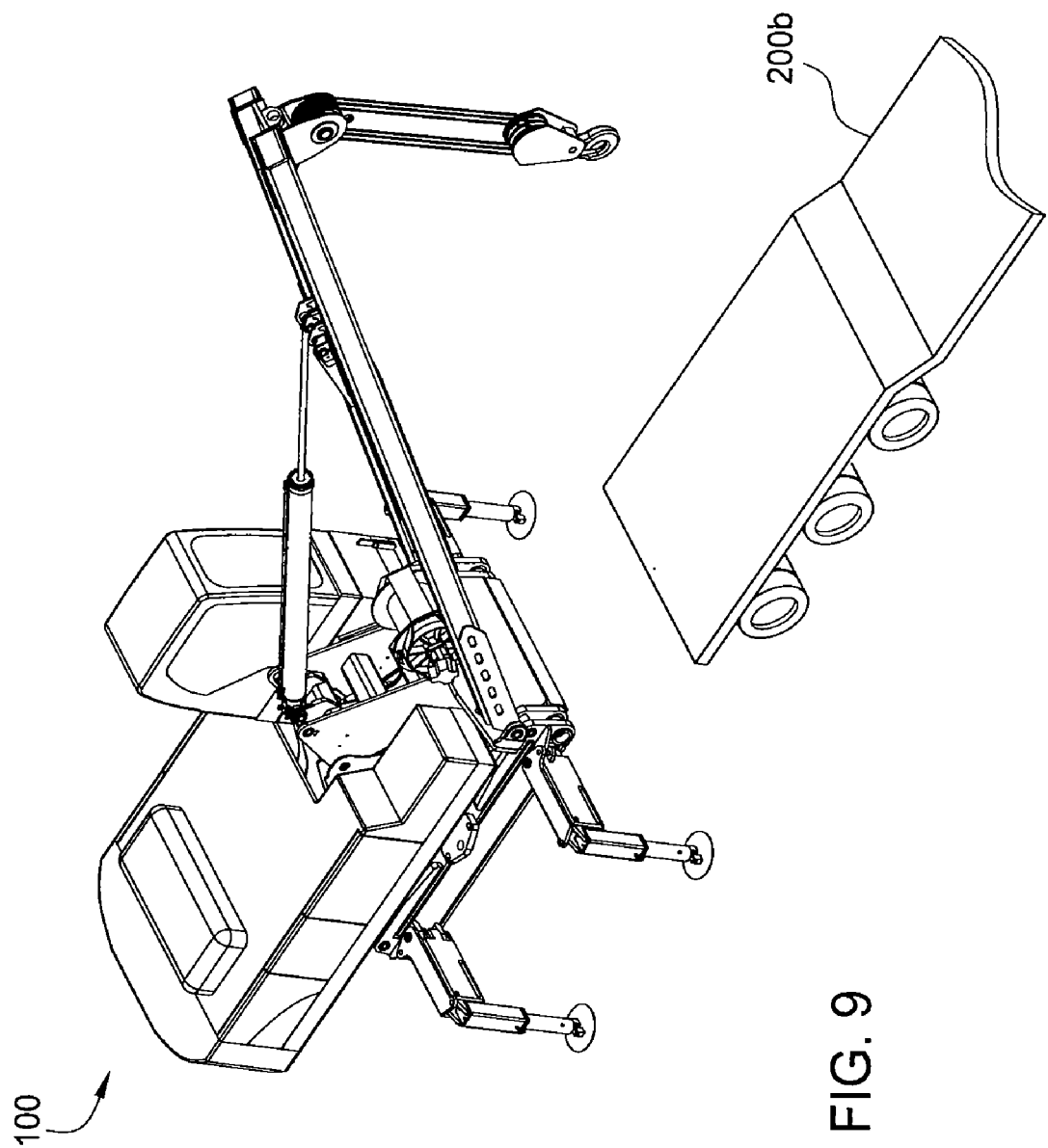
Figure 10:
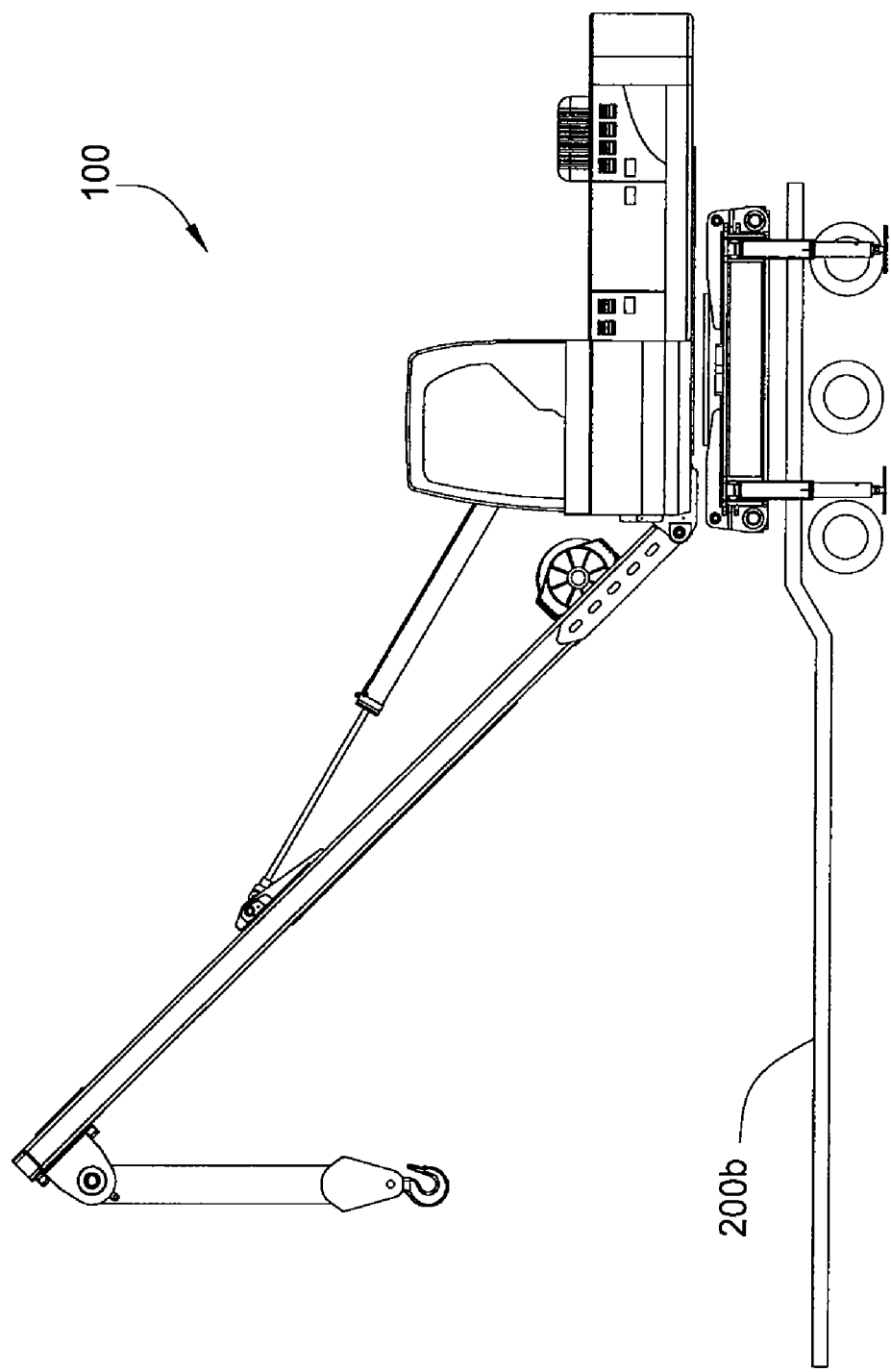
Figure 11:
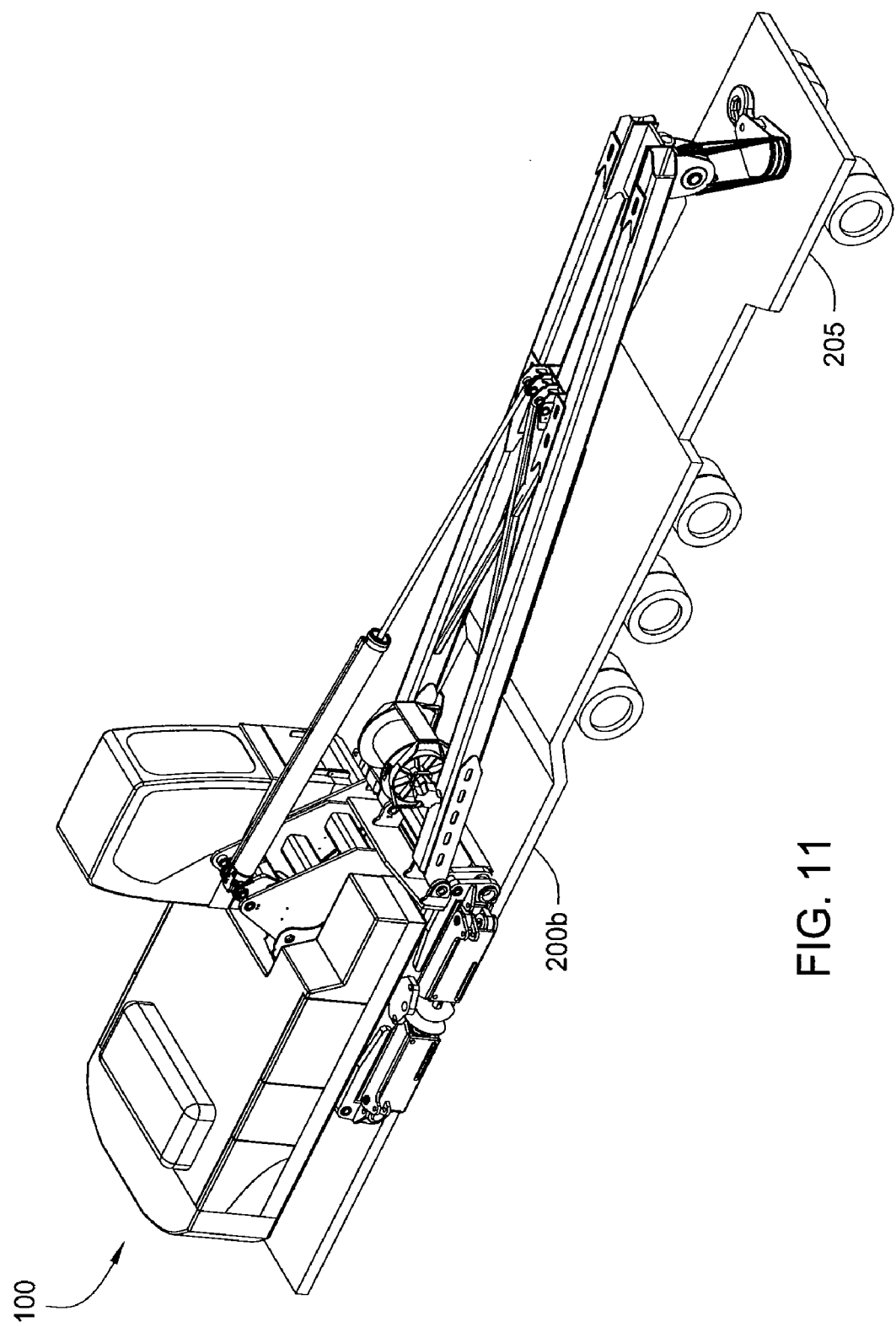

FIG. 9 illustrates an act of backing the second trailer 200b underneath the remaining pipelayer 100 (minus the two track assemblies 175). FIG. 10 illustrates axles of the second trailer passing underneath the remaining pipelayer 100. FIG. 11 illustrates the remaining pipelayer 100 loaded on the second trailer. After the track assemblies 175 have been removed and loaded on the first trailer 200a, the second trailer 600b is aligned for backing up underneath the remaining pipelayer 100. The second trailer 600b is positioned so that a longitudinal axis of the trailer is perpendicular to the longitudinal axis Luc of the undercarriage 150b. This is because the length of the lower frame 160 may be equal to or less than or substantially equal to or less than a width of the second trailer 200b whereas the width of the lower frame 160 may be greater or substantially greater than the width of the second trailer 200b. The main assembly 150a may be oriented so that the cab 115 faces the second trailer 200b so that the operator may view the second trailer 200b backing up. Alternatively, the main assembly 150a may be oriented so that the cab 115 faces away from the second trailer 200b and the operator may exit the cab 115 and view the backing up of the trailer 200a from the ground.

FIG. 10 illustrates axles of the second trailer 200b passing underneath the remaining pipelayer 100. Backing up of the second trailer 200b then commences. The jack assemblies 165 provide sufficient clearance for axles of the second trailer 200b to pass underneath the remaining pipelayer 100. Before finishing the backing up of the second trailer 200b, the main assembly 150a may be rotated 180 degrees (or may already be in that position) so that the truck operator may place the counterweight 145 or second side 105b of the main frame 105 in substantial vertical alignment with a front end of the second trailer 200b (the end proximate the tractor).

FIG. 11 illustrates the remaining pipelayer 100 loaded on the second trailer 200b. Once the remaining pipelayer 100 is aligned with the front end of the second trailer 200b, the jack assemblies 165 are retraced until the lower frame 160 rests on the second trailer 200b. The jack assemblies 165 may then be fully actuated to the retracted position for transport. The boom 120 may then be lowered to a horizontal or nearly horizontal position. The boom 120 may hang over a rear end of the second trailer 200b. A stinger or flip trailer 205 may be hitched to the rear end of the second trailer 200b to contain the overhang (depending on the length of the overhang and the local transportation laws). Alternatively, a shorter boom may be used so that there is no overhang. The pipelayer 100 may then be transported to another worksite using the two tractor-trailers 200a, b.

Figure 12:
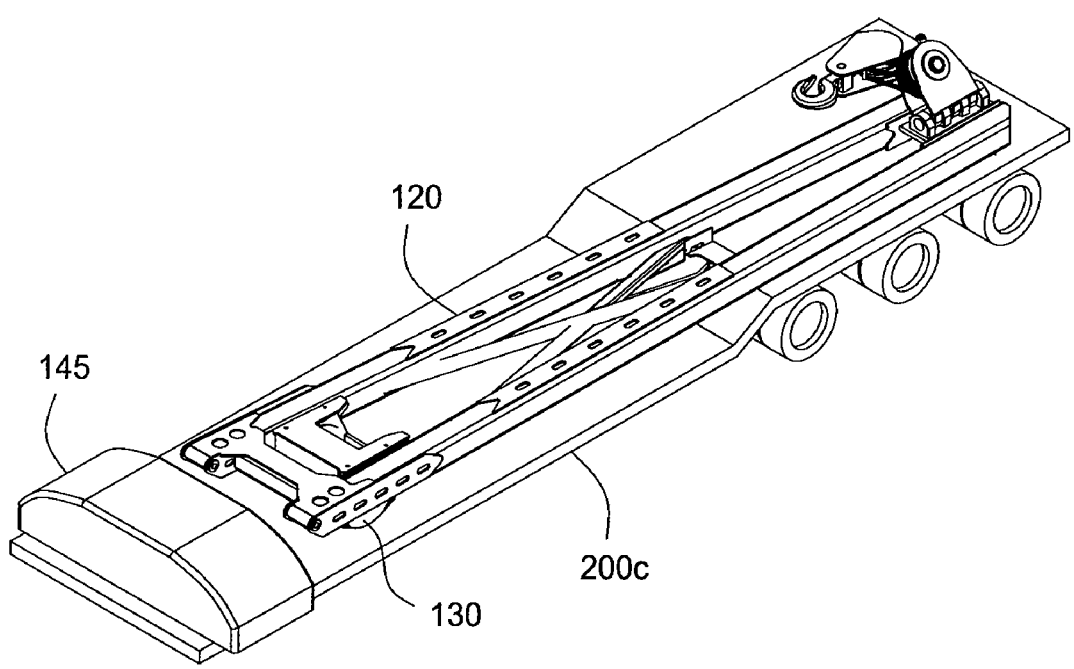

FIG. 12 illustrates the boom and counterweight loaded on a third trailer 200c. If, for example, the route to the next work site crosses a load zoned bridge, it may be necessary to reduce the weight of the second trailer 200b. The counterweight 145 and the boom 120 may then be removed and transported on a third trailer 200c. Alternatively, the counterweight 145 and the boom 120 may be removed prior to loading the remaining pipelayer 100 onto the second trailer 200b. The stinger trailer 205 would not be used for the second trailer 200b. As shown, the boom 120 is loaded with the winch 130 facing the third trailer 200c and supporting the first end of the boom 120. Alternatively, the boom 120 may be loaded with the winch 130 facing away from the third trailer 200c and a block (not shown) may be used to support the first end of the boom 120.

The PCA 125 may be left on the remaining pipelayer 100, may be removed with the boom 120, or may be removed from both the boom 120 and the remaining pipelayer 100. If the PCA 125 is left on the remaining pipelayer 100, a free end may be supported by a bracket (not shown). If the PCA 125 is removed from both the boom 120 and the remaining pipelayer 100, then it may be transported on either the second 200b or the third trailer 200c. Alternatively, if the adaptor 110 is used, the adaptor 110 and the boom 120 together (disposing of the need to disassemble the PCA 125) may be loaded on the third trailer 200c (with the counterweight 145) or the boom 120 may be separated from the adapter 110 and loaded as shown. Alternatively, only one of the boom 120 and the counterweight 145 may be removed from the remaining pipelayer 100 and loaded on the third trailer 200c.

Figure 13:
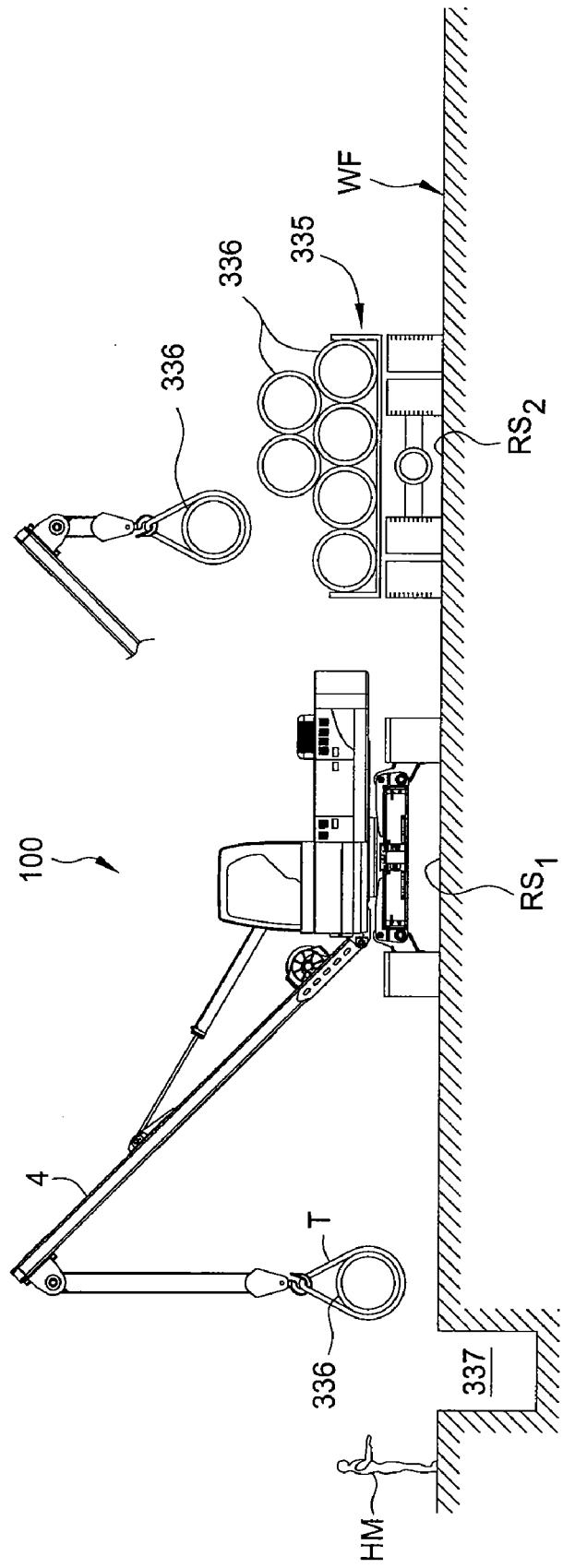
FIG. 13 illustrates a short pipe transporting act of the pipelaying operation.
Figure 14:
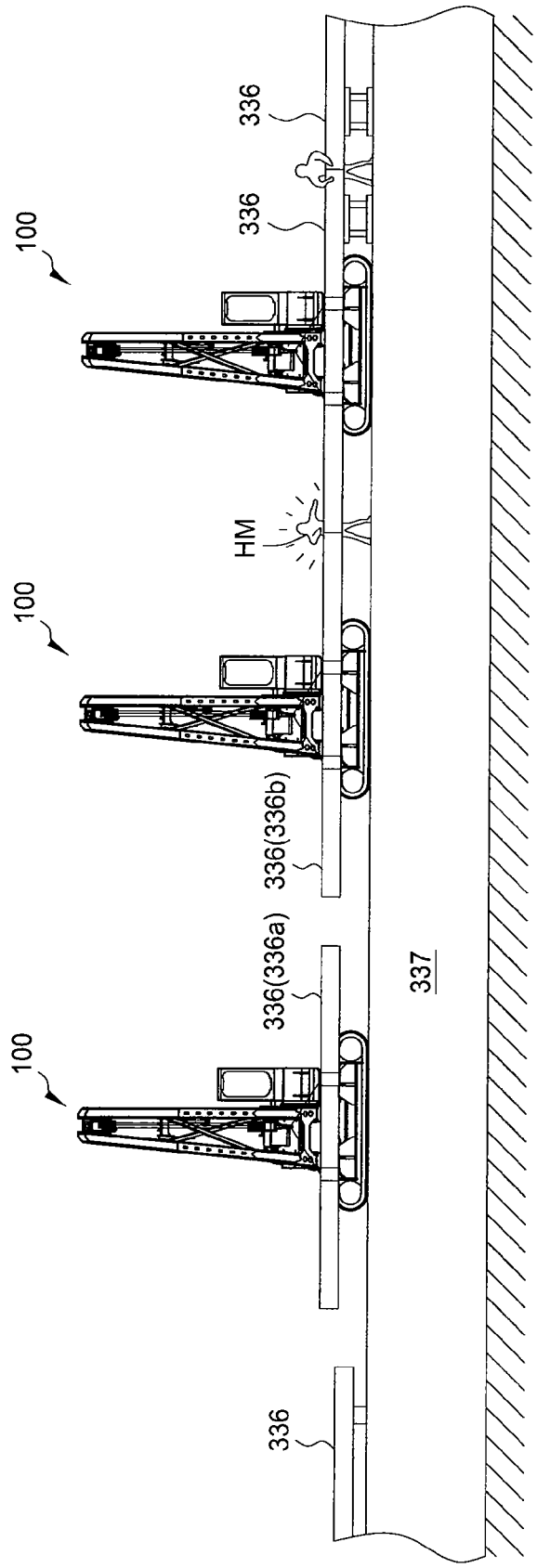
FIG. 14 illustrates a short pipe centering/joining act of the pipelaying operation.
Figure 15:
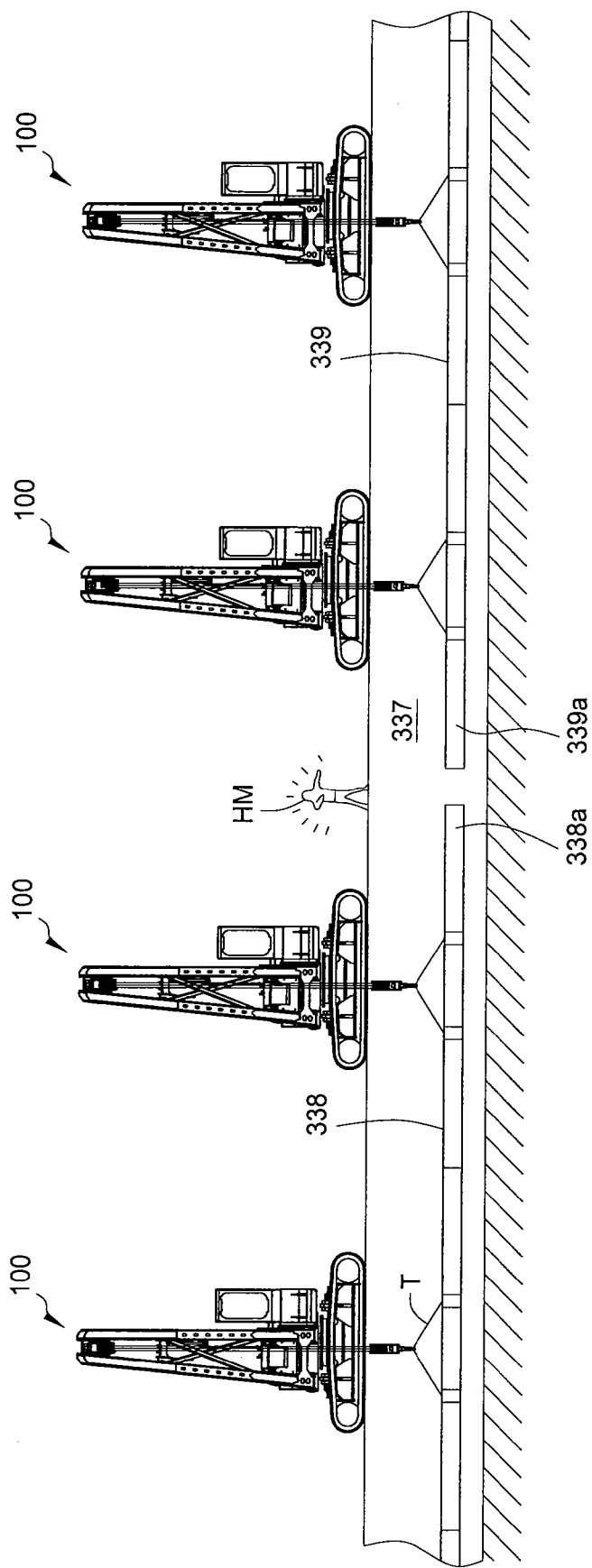
FIG. 15 illustrates long pipe centering/joining act of the pipelaying operation.

FIGS. 13-16 illustrate a pipelaying operation using one or more pipelayers 100, according to another embodiment of the present invention. FIG. 12 illustrates a short pipe transporting act of the pipelaying operation. FIG. 13 illustrates short pipe centering/joining act of the pipelaying operation. FIG. 14 illustrates long pipe centering/joining act of the pipelaying operation. FIG. 15 illustrates a centering/joining act of the pipelaying operation performed on a grade.

In the pipelaying operation, the following acts are repeated: (a) short pipe transporting: short pipes 336 stacked on a material handling vehicle 335 are moved to a place near a trench 337 and arranged in a line; (b) short pipe centering/joining: an adequate number of short pipes 336, which have been aligned in the place near the trench 337 by the short pipe transporting act, are joined by welding into a long pipe 338; and (c) long pipe centering/joining act: the long pipe 338 prepared by the short pipe centering/joining act is joined by welding to the pipeline 339 under construction.

As shown in FIG. 13, a working field WF is formed in the short pipe transporting operation on the right of the trench 337, which has been dug. In the working field WF, a traveling space $RS_1$ for the pipelayer 100 and a traveling space RS2 for the material handling vehicle 335 are arranged in this order from the side of the dug trench 337, so that the pipelayer 100 and the material handling vehicle 335 can travel together in an operating direction parallel with the dug trench 337. After the self-propulsion of the undercarriage 150b allows the pipelayer 100 to move the distance corresponding to the planned pitch of alignment of the short pipes 336 in the operating direction, the main assembly 150a turns about to take one of the short pipes 335 out of the material handling vehicle 335 and place it near the dug trench 337. Each of the short pipes 336 are prepared for laying by wrapping a sling T therearound. By repeating this operation, some or all the short pipes 336 stacked on the material handling vehicle 335 are moved to and aligned in the place near the dug trench 37.

In the short pipe centering/joining act, as shown in FIG. 14, the short pipes 336 aligned in the place near the dug trench 337 are raised to a level suited for welding operation and the are centered to make longitudinal axes of adjacent short pipes 336a, 336b coincident with each other. Centering of the short pipes 336 is performed by cooperation of a plurality of pipelayers 100 based on an instruction from the hoistman HM.

In the long pipe centering/joining act, as shown in FIG. 15, an end 338a of the long pipe 338 and an end 339a of the pipeline 339 under construction are raised to a level suited for welding operation and centered to make longitudinal axes of the ends 338a, 339a coincident with each other. Centering of the ends 338a, 339a is also performed by cooperation of a plurality of pipelayers 100 based on an instruction from the hoistman HM.

Figure 16:
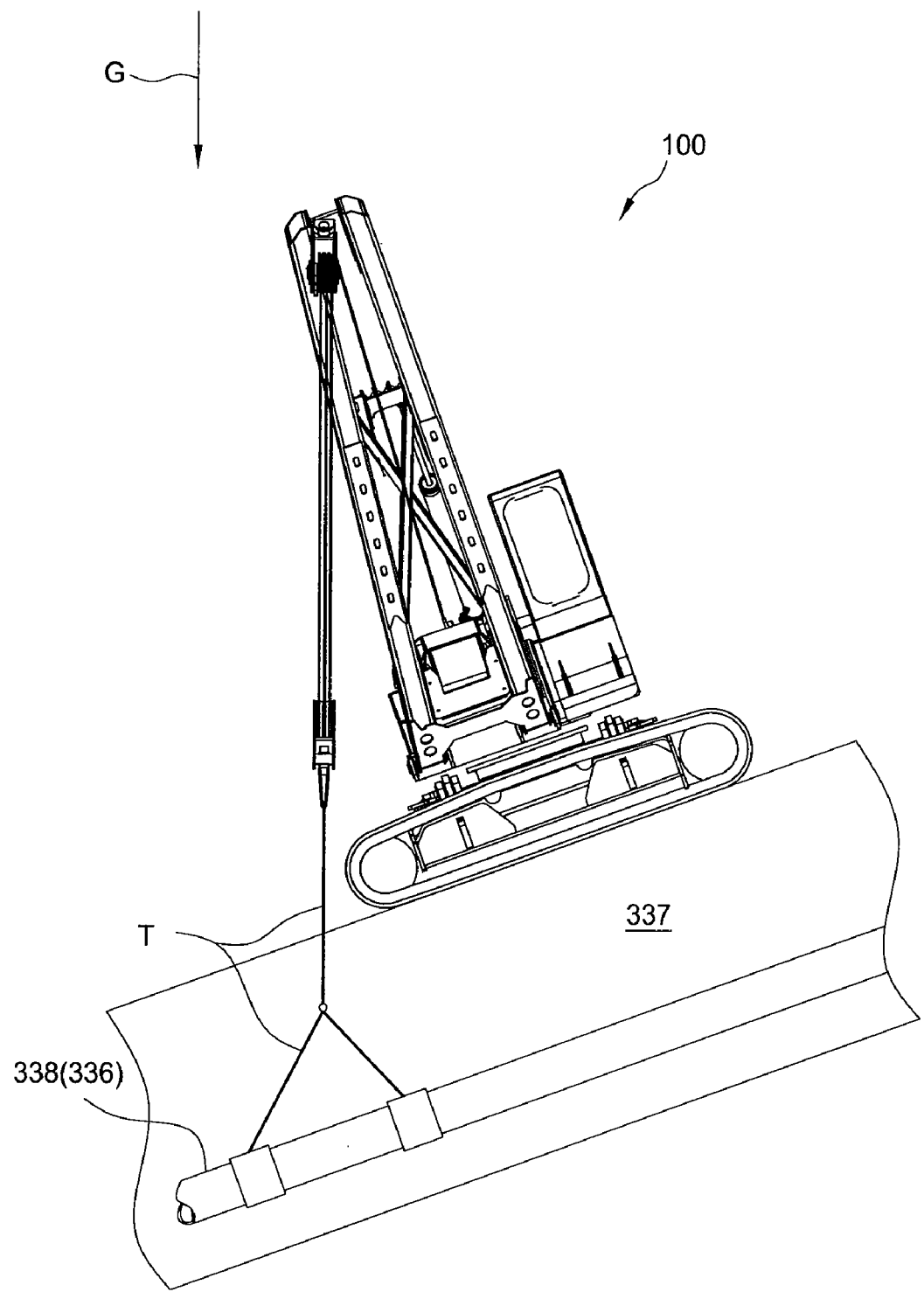
FIG. 16 illustrates long pipe centering/joining act of the pipelaying operation performed on a grade.

If either of the centering/joining acts is carried out on a grade, these acts may proceed as shown in FIG. 16. The pivoted pulley block 135 compensates for the grade, thereby maintaining a portion of the cable 132 and the load block 140 aligned with a direction of gravity G.

Figure 17:
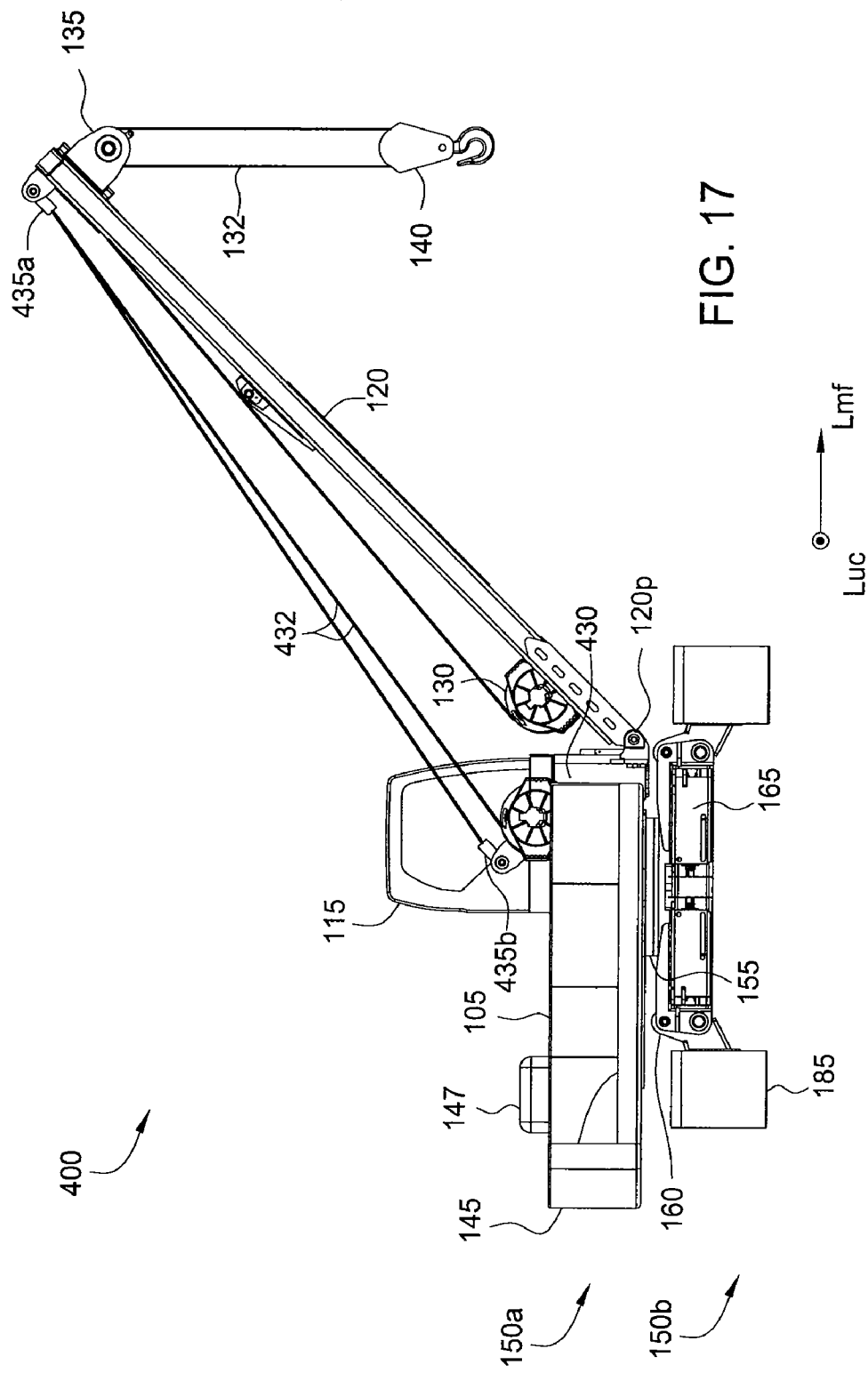
FIG. 17 is an orthogonal view of a pipelayer, according to an alternative embodiment of the present invention.

FIG. 17 Is an orthogonal view of a pipelayer 400, according to an alternative embodiment of the present invention. A second winch 430 is used instead of the PCA 125 to hoist the boom 120. The second winch 430 is attached to the adaptor 110 or directly to the main frame 105 and includes a second drum having a second cable 432 wrapped therearound. The second drum is rotatable relative to a second housing of the second winch 430. The second drum may be driven by a hydraulic motor (not shown). Pivoted to the second longitudinal end of the boom 120 is a first sheave block 435a. A second sheave block 435b is pivoted to the second winch housing, the adaptor 110, or directly to the main frame 105. Each of the sheave blocks 435a, b includes a plurality of pulleys or sheaves. The cable 132 extends from the second drum and around the sheaves of the sheave blocks 435a, b in order to achieve a mechanical advantage. Unwinding of the cable 432 from the second winch drum lowers the boom 120 and winding of the cable 432 around the second winch drum raises the boom 120. Loading of the pipelayer 400 is similar to loading of the pipelayer 100. If the third trailer 200c is used, the first sheave block 435a may simply be removed and loaded on the second trailer 200b with the remaining pipelayer 400 (may depend on whether the adaptor 110 is used, see above). Usage and loading of the pipelayer 400 is similar to usage and loading of the pipelayer 100.

In another alternative embodiment, the winch 130 may be attached to a modified adaptor instead of the boom 120, for example, proximate to the cab 115. In another alternative embodiment, the second winch 430 may be used instead of the PCA 125 to hoist the boom 120 and both the second winch 430 and the winch 130 may be attached to a modified adaptor, for example, proximate to the cab 115. In another alternative embodiment, the winch 130 may be attached to the main frame 105 instead of the boom 120, for example, proximate to the cab 115. In another alternative embodiment, the boom may be longitudinally extended by adding a second boom section (not shown) flanged to the boom 120. The flange may include a hinge so that the second boom section may be folded over the boom 120 for transportation.

In another alternative embodiment, a modified adaptor (not shown) may be used having a first member pivoted to the first side of the main frame and a second member pivoted to the second side of the main frame, the two members also pivoted together. In a one aspect of this alternative embodiment, the second winch 430 may be used instead of the PCA 125 to hoist the boom 120 and the second winch 430 may be attached to the one of the adaptor members proximate to the pivot between the members. In another aspect of this alternative embodiment, the winch 130 may be attached to the one of the adaptor members proximate to the pivot between the members instead of to the boom 120. In another aspect of this alternative embodiment, the boom 120 may be pivoted to the first adaptor member at a location midway along the adaptor member and the PCA 125 may be pivoted to the adaptor member at the first side of the main frame. In another aspect of this alternative embodiment, a second winch may be used instead of the PCA 125 to hoist the boom 120 and both winches 130, 430 may be located on the adaptor members proximate to the pivot between the adaptor members.

Figure 18D:
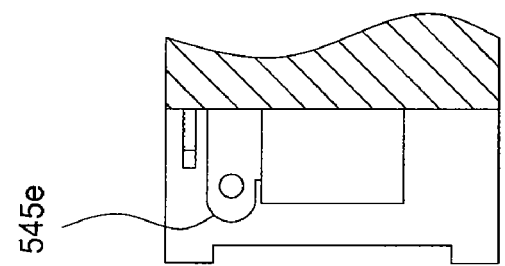
Figure 18C:
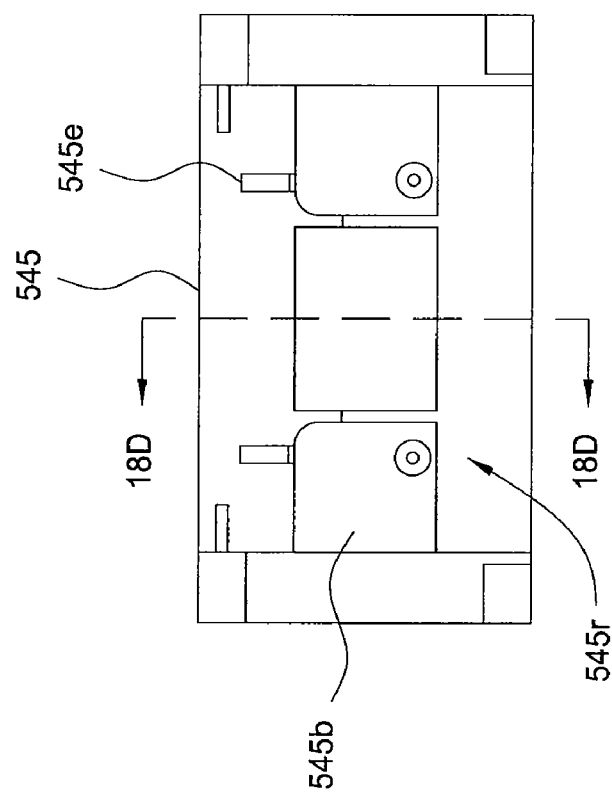

FIGS. 18A-D illustrate a removable counterweight system (RCW) 500, according to another embodiment of the present invention. FIG. 18A is a side view of the RCW 500 in a first position where a counterweight 545 is removably attached to the main frame 105 (at second side 105*b*). FIG. 18B is a side view of the RCW 500 in a second position where the counterweight 545 is removed from the main frame 105 and set on the ground. The counterweight 545 is shown separately in FIGS. 18C-D for clarity. FIG. 18C is a front view of the counterweight 545. FIG. 18D is a section view of FIG. 18C taken along line 18D-18D.

The RCW 500 may be installed on the pipelayer 100 in lieu of the counterweight 145. The RCW 500 may be hydraulically operated between the first and second positions. The RCW 500 may be operated from the cab 115 and/or from controls (not shown) located on the main frame 105. The RCW 500 allows for quick, automated, and independent removal of the counterweight 545 in instances where the pipelayer 100 (or 400) will be operated on steep grades. During steep grade operation, the counterweight 145/545 destabilizes the pipelayer 100 in certain rotational orientations of the main assembly 150*a* relative to the undercarriage 150*b* and/or loading scenarios. Removal of the counterweight 545 allows more versatile operation of the pipelayer 100 on steep grades. Alternatively or in addition thereto, the weight of the lower frame 160 may be increased by adding weights (not shown) or increasing the thickness of structural members to compensate for removal of the counterweight 545 and/or increase stability of the pipelayer 100 on steep grades. Alternatively or in addition to using the RCW for steep grade operation, the RCW 500 may be used to load the counterweight 545 on the third trailer 200*c* (discussed above). Alternatively, the pipelayer 100 may be operated on steep grades without the RCW 500 by relying on the LMS to safely constrain movement of the pipelayer 100 from unstable positions.

The RCW 500 may include a piston and cylinder assembly (PCA) 505, a base 510, a head 520, one or more front arms 525*a*, one or more rear arms 525*b*, and the counterweight 545. The base 510 is attached to the main frame 105 via lugs. One or more blocks (not shown for clarity) may be attached to the main frame 105 proximate to the base 510. The PCA 505 is pivoted to the main frame 105 via a lug and pivoted to the head 520. The front arms 525*a* are pivoted to the main frame 105 via lugs and pivoted to the head 520. The rear arms 525*b* are pivoted to the main frame 105 via lugs and pivoted to the head 520. One or more forks 515 are also pivoted to the head 520. The forks 515 allow the counterweight 545 to be pivoted to the head 520 by receiving respective eyes 545*e* attached to the counterweight 545. Once holes through the forks are aligned with respective holes through the eyes 545*e*, pins (not shown) are inserted through each fork and eye, thereby securing the counterweight 545 to the head 520. The forks may 515 also be free to rotate about their longitudinal axis.

The counterweight 545 includes a body having a recess 545*r* formed therein, one or more blocks 545*b* attached thereto and disposed in the recess 545*r*, and the eyes 545*e* attached thereto and disposed in the recess. The eyes 545*e* may be attached to the body via the blocks 545*b*. When the counterweight 545 is in the first position, the PCA 505, the base 510, the arms 525*a, b*, and the forks 515 may be disposed in the recess 545*r*. The head 520 may extend upward out of the recess 545*r* or be disposed in the recess 545*r* as well.

Starting from the first position where the PCA 505 is fully extended, retraction of the PCA 505 articulates the head 520 (and the counterweight 545) horizontally away from the main frame 105 and vertically downward until the counterweight 545 is seated on the ground. The front 525*a* and rear 525*b* arms support the head 520 as it articulates between the first and second positions. Once the counterweight 545 is seated on the ground, the pins may be removed and the head 520 may be returned to the first position to stow it for pipelayer operation without the counterweight 545. To re-attach the counterweight 545, the process is reversed. The head 520 is articulated to the second position, the pins inserted, and the PCA extended. Extension of the PCA articulates the head 520 (and the counterweight 545) vertically upward and horizontally toward the main frame 105 until bottoms of the blocks 545*b* are seated on the base 510 and faces of the blocks 545*b* abut the base blocks. One or more safety latch mechanisms (not shown) may be actuated (manually or automatically) once the counterweight 545 is seated on the base 510. Further, a proximity sensor may be provided to verify that the counterweight has properly seated.

Figure 19:
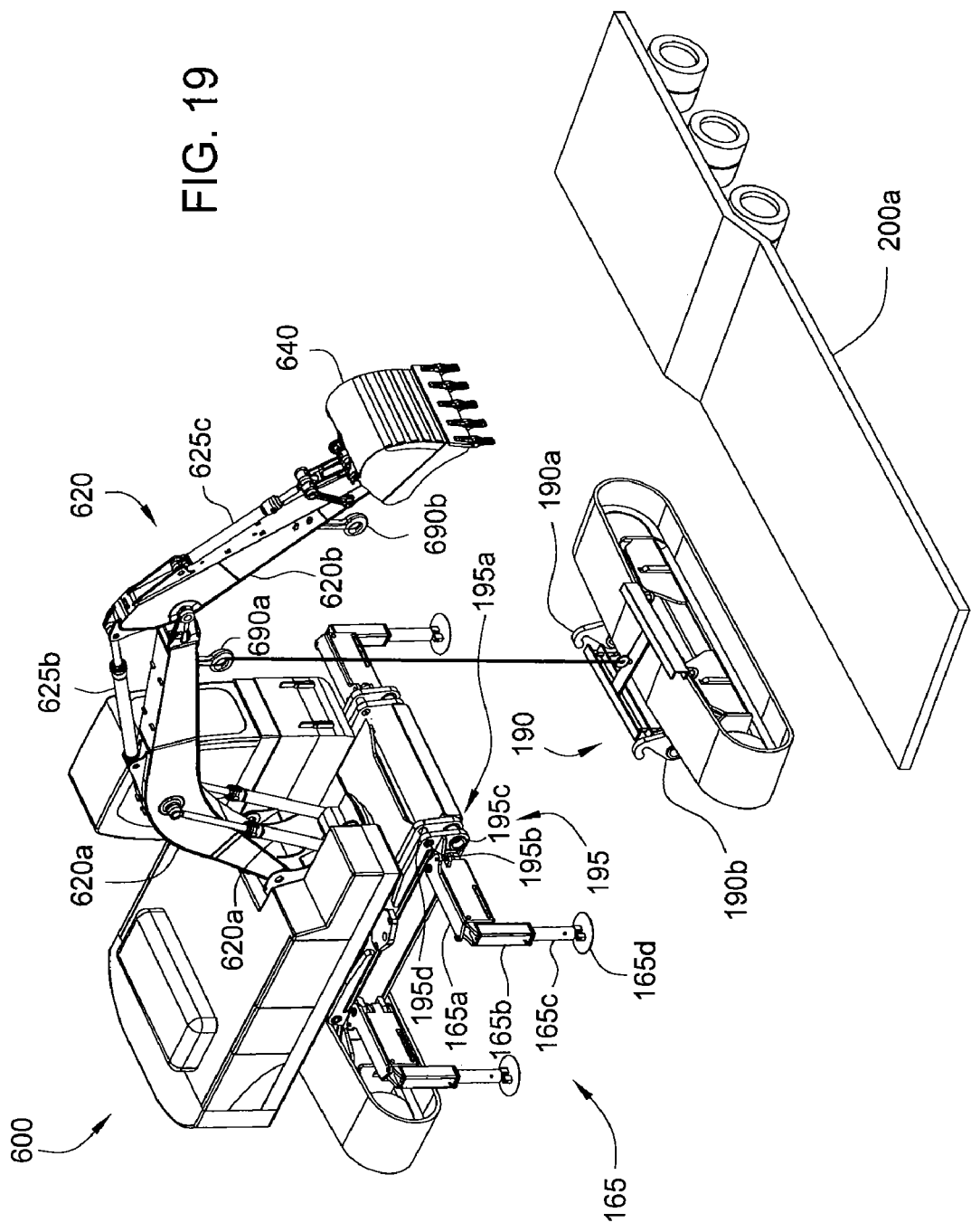
FIGS. 19-21 illustrate an excavator and acts of a method for partially disassembling the excavator and loading the excavator on two or more tractor-trailers for transporting the excavator between work sites over public roads, according to another embodiment of the present invention.
Figure 20:
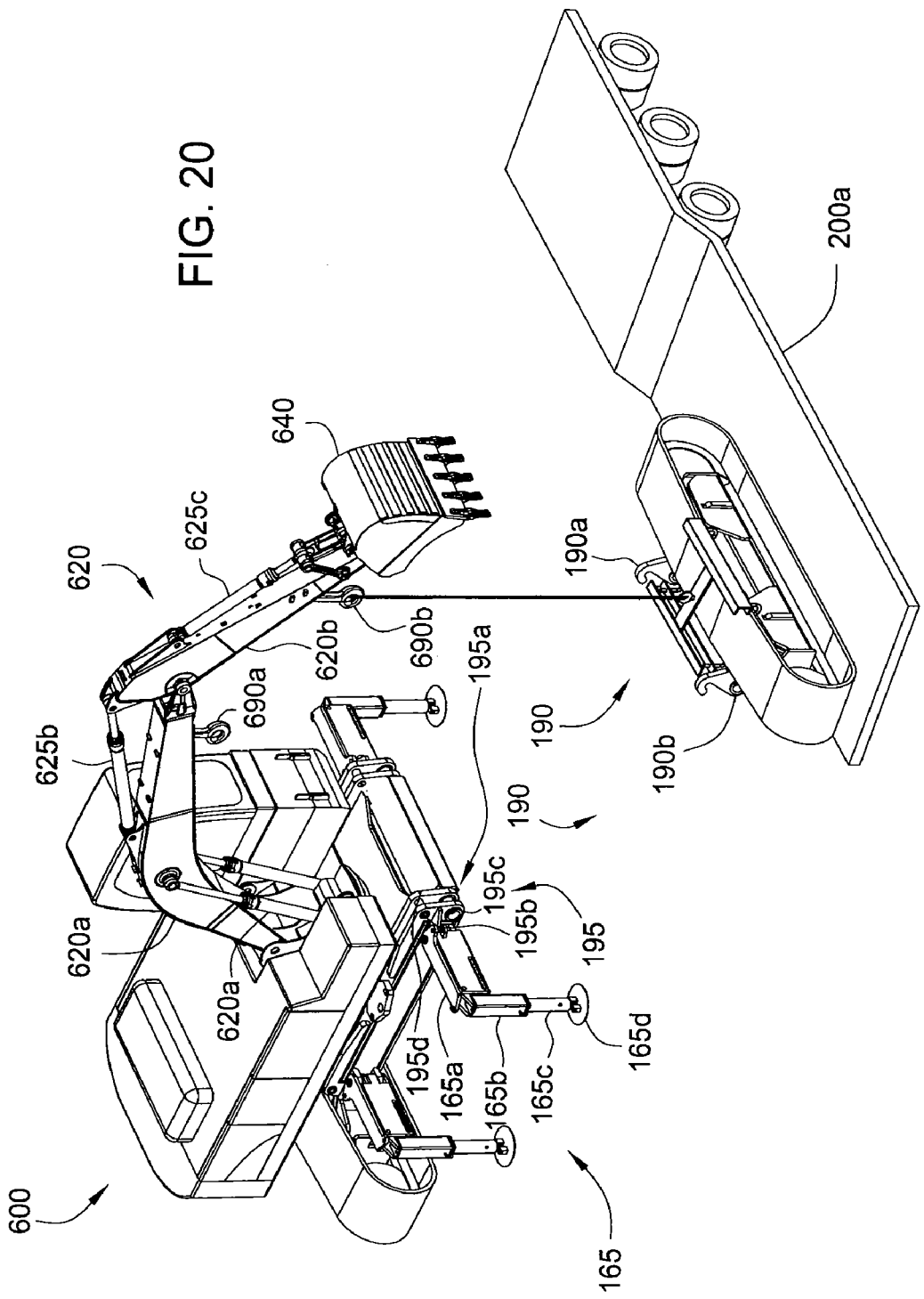
Figure 21:
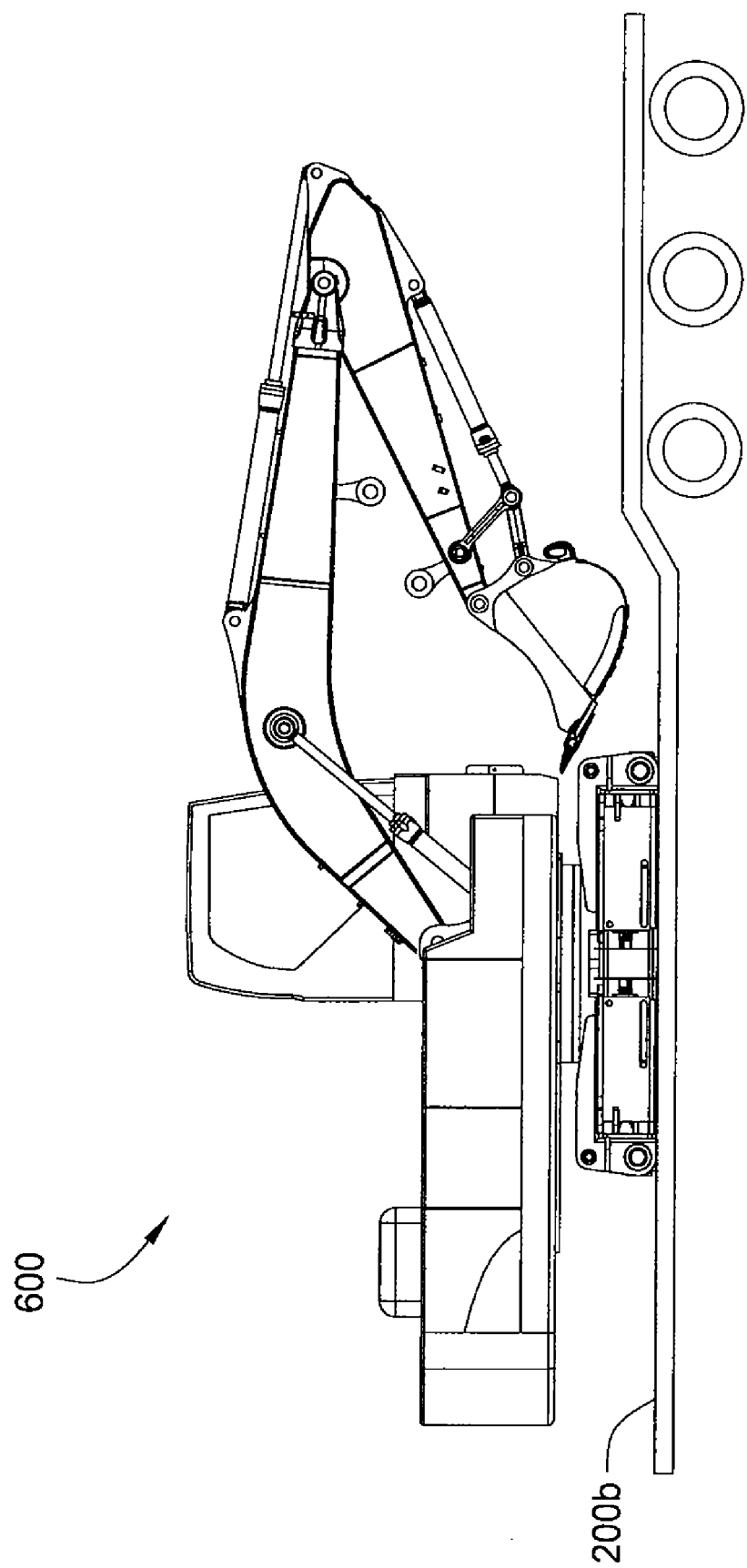

FIGS. 19-21 illustrate an excavator 600 and acts of a method for partially disassembling the excavator 600 and loading the excavator on two or more tractor-trailers 200*a-c* (only trailer shown and gooseneck removed for simplicity) for transporting the excavator 600 between work sites over public roads, according to another embodiment of the present invention. Acts similar to those described above with reference to FIGS. 7-12 will not be repeated. The excavator 600 may be the pipelayer 100 after the adapter 110 and the boom 120 have been removed and an excavator boom assembly 620 attached to the main frame 105. The excavator boom assembly 620 includes a boom 620*a* pivoted to the main frame 105 at a first end thereof and an arm or stick 620*b* pivoted to the second end of the boom 620*a* at a first end thereof. One or more first PCAs 625*a* are pivoted to the main frame and pivoted to the boom 620*a* for articulating the first boom to the main frame 105. A second PCA 625*b* is pivoted to the boom 620*a* and pivoted to the stick 620*b* for articulating the stick 620*b* relative to the boom 620*a*. A bucket 640 is pivoted to the second end of the stick 620*b*. A third PCA 625*c* is pivoted to the stick 620*b* and to the bucket 640 via a linkage for articulating the bucket 640 relative to the stick 620*b*.

FIG. 19 illustrates the outriggers 165 in the extended position and a first act of loading one of the track assemblies 175 on the first trailer 200a. FIG. 20 illustrates a second act of loading one of the track assemblies on the first trailer 200a. First and second eyes 690a, b are attached to the boom 620a and the stick 620b, respectively. The second eye 690b is optional as an eye located on the back of the bucket 640 may be used instead. Once the track assembly 175 is ready to be removed, the boom assembly 620 is articulated to the position shown and the clamp 250 is secured to the first eye 690a with a cable. The boom assembly 620 is raised to lift the track assembly 175 from the brackets 195. The track assembly 175 will then swing away from the remaining excavator 600. The boom assembly 620 may then be lowered and the track assembly 175 set on the ground. In this position, the boom assembly 620 may then be articulated so the clamp 250 (and cable) may be secured to the second eye 690b. Once the clamp 250 is secured to the second eye 690b, the boom assembly 620 may be articulated to load the track assembly 175 onto the first tractor-trailer 200a. The acts may then be repeated to load the other track assembly 175 onto the first tractor-trailer 200a (with the addition of rotating the main assembly 150a about the undercarriage 150b).

Alternatively, a winch (not shown) may be attached to the boom assembly 620 instead of the eyes 690a, b for hoisting the track assemblies. The winch may be attached to the stick 620b near the bucket 640. In this alternative, the clamp 250 would be connected to the winch cable and the winch would then be operated to lift and swing the track assembly over to the winch. The boom assembly would then be articulated to lower the track assembly onto the tractor trailer 200a.

FIG. 21 illustrates the remaining excavator 600 loaded on the second trailer 200b. Once the track assemblies 175 have been loaded on the first tractor trailer 200a, the remaining excavator 600 may be loaded onto the second tractor trailer 200b. The boom assembly 620 may be articulated so that the arm 620b is folded underneath the boom 620a. Since the stick 620b can be folded underneath the boom 620a, the stinger trailer 205 is not required. As discussed above with reference to FIG. 12, if it is necessary to reduce the weight of the second trailer 200b, the counterweight 145 and/or the boom assembly 620 may be loaded on a third tractor-trailer 200c.

Figure 22:
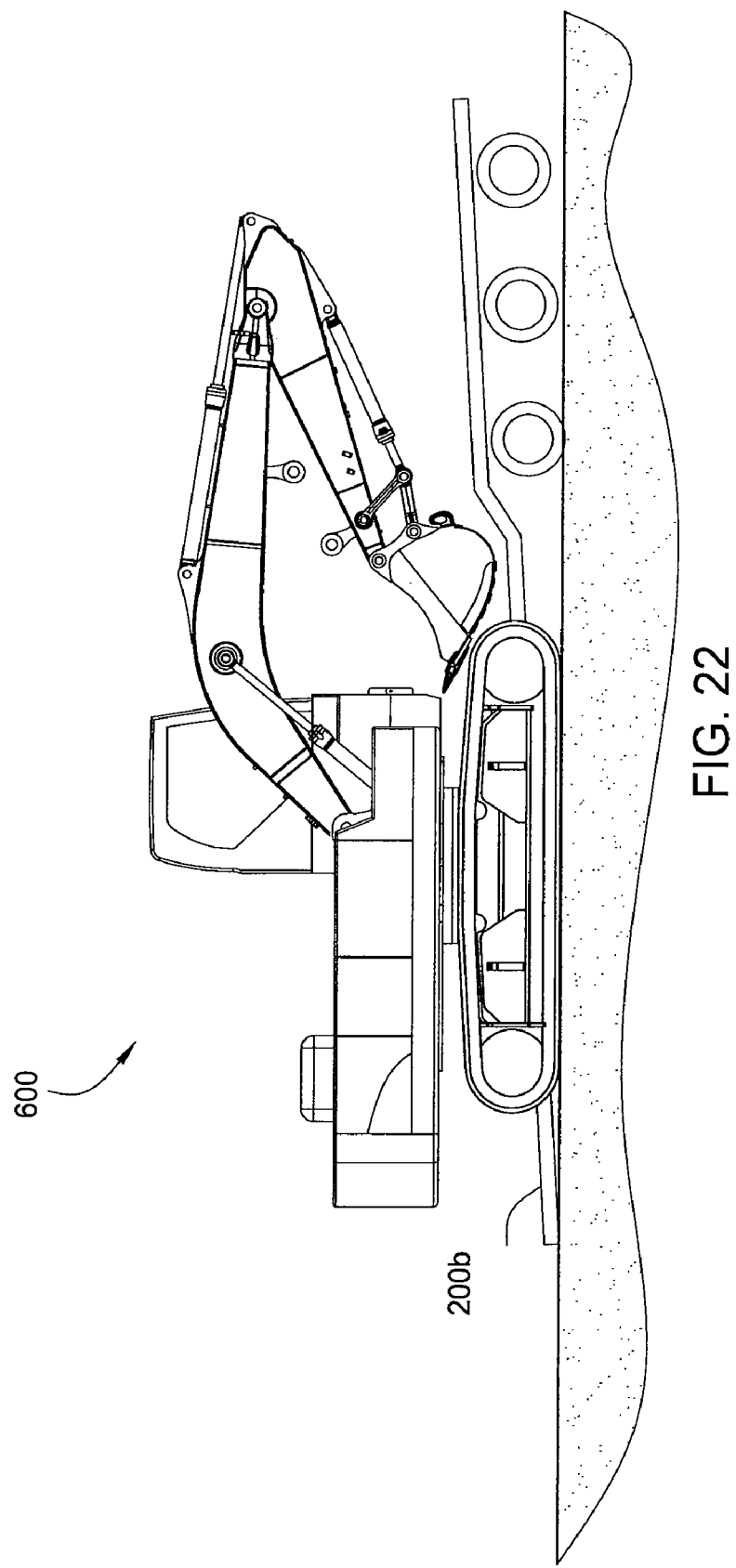
FIGS. 22 and 23 illustrate acts of a method for partially disassembling the excavator (or pipelayer) and loading the excavator on two or more tractor-trailers (only trailer shown) for transporting the excavator between work sites over public roads, according to another embodiment of the present invention.
Figure 23:
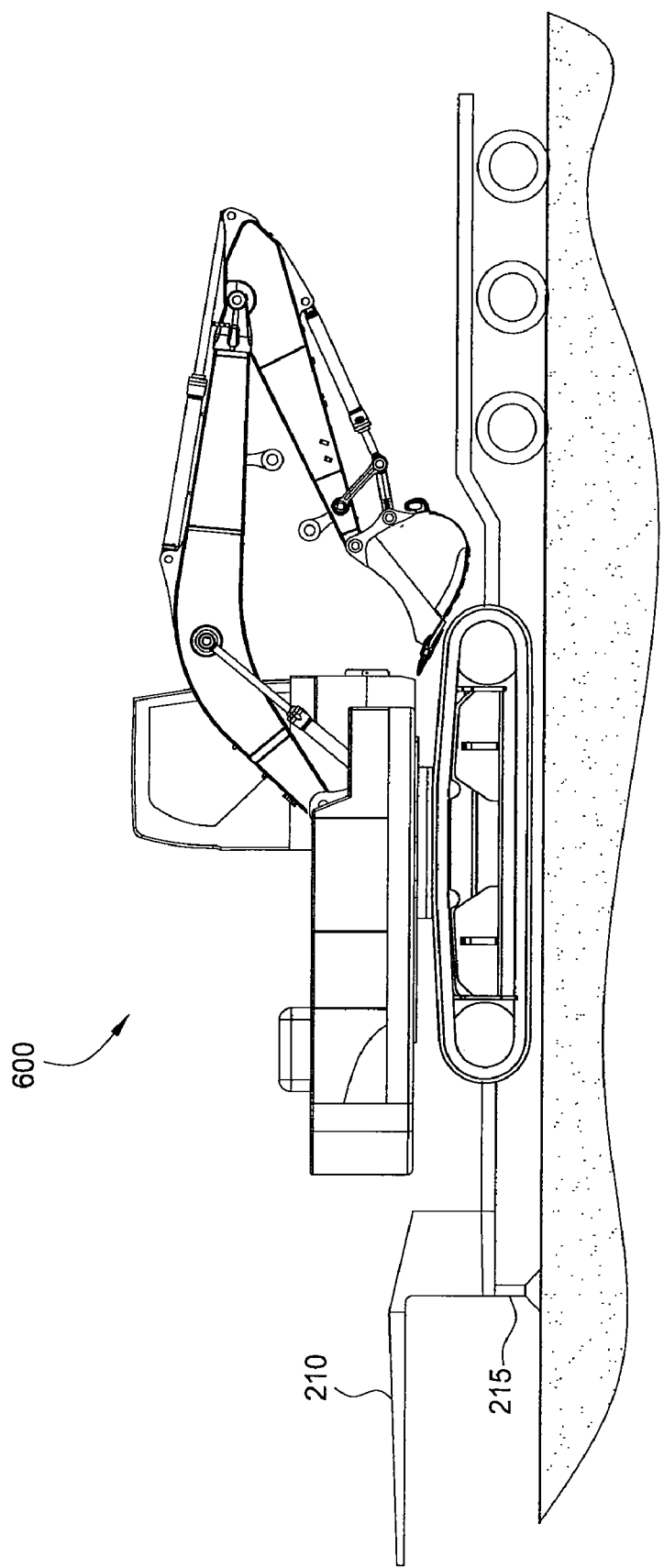

FIGS. 22 and 23 illustrate acts of a method for partially disassembling the excavator 600 (or pipelayer 100, 400) and loading the excavator 600 on two or more tractor-trailers 200a-c (only trailer shown) for transporting the excavator 600 between work sites over public roads, according to another embodiment of the present invention. FIG. 22 illustrates the excavator 600 driven over the trailer 200b after a gooseneck 210 of the trailer has been removed. FIG. 23 illustrates the excavator 600 lifted off the track shoes 120 by a gooseneck jack 215.

In this embodiment, the excavator 600 or the pipelayer 100 may be loaded for transportation without requiring the outriggers 165. Instead of raising the excavator 600 or the pipelayer 100 off of the track shoes using the outriggers 165, the gooseneck jack 215 is used. As shown, the boom assembly 620 is in the folded position; however, the boom assembly may also be in the position illustrated in FIGS. 19 and 20. The trailer 200b is removed from the tractor and a front end of the trailer 200b set on the ground. The gooseneck 210 of the trailer 200b is removed from a front end of the trailer 200b. The excavator 600 or the pipelayer 100 is driven over the trailer 200b via the front end and parked. Wood blocks may be placed between the lower frame 160 and the trailer 200b. The gooseneck 210 is reattached to the front end of the trailer 200b. The jack 215 included with the gooseneck 210 is used to raise the front end off the ground, thereby also raising the excavator 600 or the pipelayer 100 off of the track shoes 120. The jack 215 may be operated using one or more hydraulic lines (not shown) connected to a hydraulic pump of the truck.

The weight may then be transferred from the gooseneck jack 215 to one or more jack stands (not shown). The lower frame 160 may be chained down to the trailer 200b. Removal and loading of the track assemblies 175 onto the trailer 200a may then proceed as shown in FIGS. 19-20 or FIGS. 7-8 and as discussed above. The trailer 200b may be attached to the tractor and the remaining excavator 600 or the pipelayer 100 transported to the next worksite using the trailer 200b (after folding the boom assembly 620 or after lowering the boom 120 and hitching the stinger 205 (if needed) as in FIG. 11). Alternatively, as discussed above, the boom 120, boom assembly 620, and/or the counterweight 145 may be removed from the remaining excavator 600 or the pipelayer 100 and loaded on the trailer 200c. Alternatively, a lowboy beam trailer (not shown) may be used instead of a lowboy flatbed trailer.

While the foregoing is directed to embodiments of the present invention, other and further embodiments of the invention may be devised without departing from the basic scope thereof, and the scope thereof is determined by the claims that follow.

The invention claimed is:

1. A counterweight system comprising:
   a base adapted to mount to a vehicle frame;
   a head operatively connected to the base;
   a counterweight having one or more counterweight connection points that are selectively connectable to the head; and
   an actuator operatively connected to the base and having a loading position in which the head is held away from the vehicle frame to facilitate connection of the one or more counterweight connection points to the head, and an operating position in which the head and counterweight are held generally adjacent the frame;
   wherein at least one block extends from a rear surface of the counterweight, and a bottom surface of the at least one block is seated on the base when the actuator is in the operating position to thereby seat the counterweight on the base; and
   wherein the counterweight comprises a body having a recess that faces the vehicle frame when the counterweight is connected to the head, the at least one block is located in the recess, and the base is disposed in the recess when the actuator is in the operating position.

2. The counterweight system of claim 1, wherein the head is operatively connected to the base by at least one front arm that is pivotally connected to the base and the head, and at least one rear arm that is pivotally connected to the base and the head.

3. The counterweight system of claim 2, wherein the base, head, at least one front arm and at least one rear arm are arranged as a four-bar linkage.

4. The counterweight system of claim 3, wherein movement of the four-bar linkage causes the head to assume a first angular orientation when the actuator is in the loading position, and a second angular orientation when the actuator is in the operating position.

5. The counterweight system of claim 3, wherein the head comprises one or more pivotally connected forks, and the one or more counterweight connection points are selectively connectable to the one or more forks to thereby pivotally mount the counterweight to the head.

6. The counterweight system of claim 5, wherein the counterweight comprises a body having a recess that faces the vehicle frame when the counterweight is connected to the head, and the base, at least one front arm, at least one rear arm, and fork are disposed in the recess when the actuator is in the operating position.

7. The counterweight system of claim 1, wherein the counterweight comprises a body having a recess that faces the vehicle frame when the counterweight is connected to the head, and the base is disposed in the recess when the actuator is in the operating position.

8. The counterweight system of claim 1, wherein the actuator comprises a hydraulic piston and cylinder assembly.

9. A counterweight system comprising:
a base connected to a vehicle frame;
a head operatively connected to the base by a linkage, the linkage being movable between a loading position in which the head is positioned distally from the vehicle frame, and an operating position in which the head is positioned above the loading position and proximal to the vehicle frame;
a counterweight adapted to selectively connect to the head; and
an actuator adapted to move the linkage between the loading position and the operating position;
wherein the counterweight comprises a recess dimensioned and shaped to receive the base when the head is in the operating position;
wherein at least one block extends from a rear surface of the counterweight, and a bottom surface of the at least one block is seated on the base when the actuator is in the operating position to thereby seat the counterweight on the base; and
wherein the counterweight comprises a body having a recess that faces the vehicle frame when the counterweight is connected to the head, the at least one block is located in the recess, and the base is disposed in the recess when the actuator is in the operating position.

10. The counterweight system of claim 9, wherein the recess is dimensioned and shaped to receive at least part of the linkage when the head is in the operating position.

11. The counterweight system of claim 9, wherein the linkage comprises at least one rear arm pivotally connected to the base and the head, and at least one front arm pivotally connected to the base and the head.

12. The counterweight system of claim 9, wherein the head comprises one or more pivotally connected forks, and the counterweight is selectively connectable to the one or more forks.

13. A counterweight system comprising:
a base connected to a vehicle frame;
a head operatively connected to the base by at least one front arm and at least one rear arm, the at least one front arm being pivotally mounted to the base at a first base location and pivotally mounted to the head at a first head location, and the at least one rear arm being pivotally mounted to the base at a second base location and pivotally mounted to the head at a second head location, wherein the first base location is spaced from the second base location and the first head location is spaced from the second head location to thereby form a four-bar linkage, the four-bar linkage being movable between a loading position in which the head is positioned distally from the vehicle frame, and an operating position in which the head is positioned above the loading position and proximal to the vehicle frame;
a counterweight adapted to selectively connect to the head; and
an actuator adapted to move the four-bar linkage between the loading position and the operating position;
wherein at least one block extends from a rear surface of the counterweight, and a bottom surface of the at least one block is seated on the base when the four-bar linkage is in the operating position to thereby seat the counterweight on the base; and
wherein the counterweight comprises a body having a recess that faces the vehicle frame when the counterweight is connected to the head, the at least one block is located in the recess, and the base is disposed in the recess when the actuator is in the operating position.

14. The counterweight system of claim 13, wherein the first base location is more distal from the vehicle frame than the second base location, and the at least one front arm extends upwards from the base and is angled towards the vehicle frame when the four-bar linkage is in the operating position.

15. The counterweight system of claim 13, wherein the first base location is more distal from the vehicle frame than the second base location, and the at least one front arm is shorter than the at least one rear arm.

16. The counterweight system of claim 13, wherein the head comprises one or more pivotally connected forks, and the counterweight is selectively connectable to the one or more forks.

\* \* \* \* \*